US010339083B2

(12) United States Patent
Ono et al.

(10) Patent No.: US 10,339,083 B2
(45) Date of Patent: Jul. 2, 2019

(54) HOST DEVICE, SLAVE DEVICE, AND REMOVABLE SYSTEM

(71) Applicant: Panasonic Intellectual Property Management Co., Ltd., Osaka (JP)

(72) Inventors: Tadashi Ono, Osaka (JP); Tatsuya Adachi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 132 days.

(21) Appl. No.: 15/397,999

(22) Filed: Jan. 4, 2017

(65) Prior Publication Data
US 2017/0192919 A1    Jul. 6, 2017

(30) Foreign Application Priority Data

Jan. 6, 2016  (JP) .................................. 2016-000791
Dec. 2, 2016  (JP) .................................. 2016-234662

(51) Int. Cl.
*G06F 13/364*  (2006.01)
*G06F 13/42*   (2006.01)

(52) U.S. Cl.
CPC ........ *G06F 13/364* (2013.01); *G06F 13/4282* (2013.01); *Y02D 10/14* (2018.01); *Y02D 10/151* (2018.01)

(58) Field of Classification Search
CPC .......................... G06F 13/364; G06F 13/4282
See application file for complete search history.

(56) References Cited

U.S. PATENT DOCUMENTS

2010/0264753 A1  10/2010  Toyama et al.
2011/0231690 A1*  9/2011  Honda ................... G11C 5/147
                                                  713/340
2012/0032528 A1   2/2012  Toyama et al.
2012/0033717 A1   2/2012  Toyama et al.

FOREIGN PATENT DOCUMENTS

JP   2003-337639 A    11/2003
WO   2009/107400 A1    9/2009

* cited by examiner

*Primary Examiner* — Ernest Unelus
*Assistant Examiner* — Ronald T Modo
(74) *Attorney, Agent, or Firm* — McDermott Will & Emery LLP

(57) ABSTRACT

In a removable system formed from a host device and a slave device detachable from the host device, when the slave device sequentially detects a signal of a first voltage level and a signal of a second voltage level from the connected host device, the signal of the first voltage level is transmitted by a second signal line. Subsequently, when the host device detects that the second signal line is at the first voltage level, the host device interrupts drive of a first signal line, and executes initialization.

39 Claims, 24 Drawing Sheets

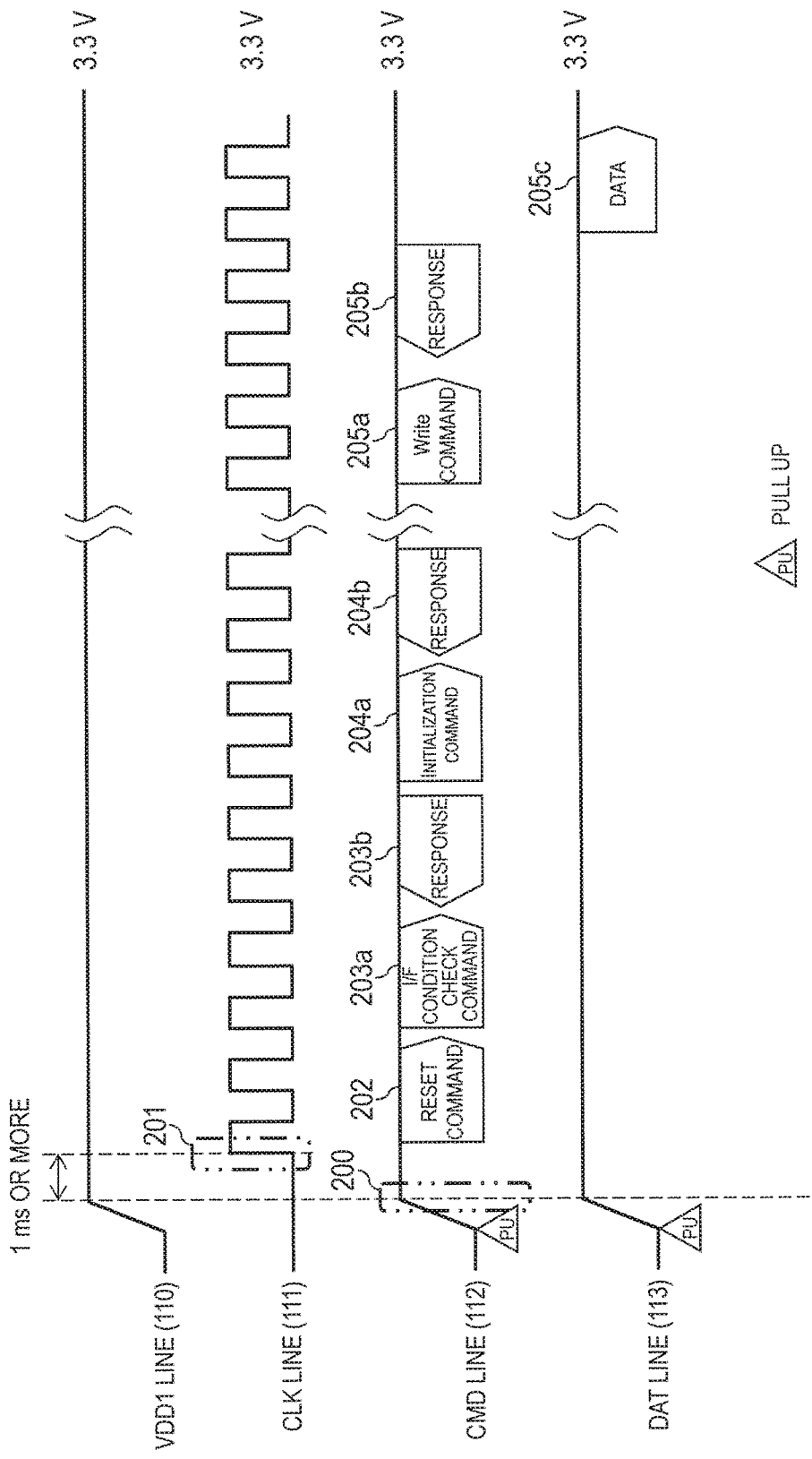

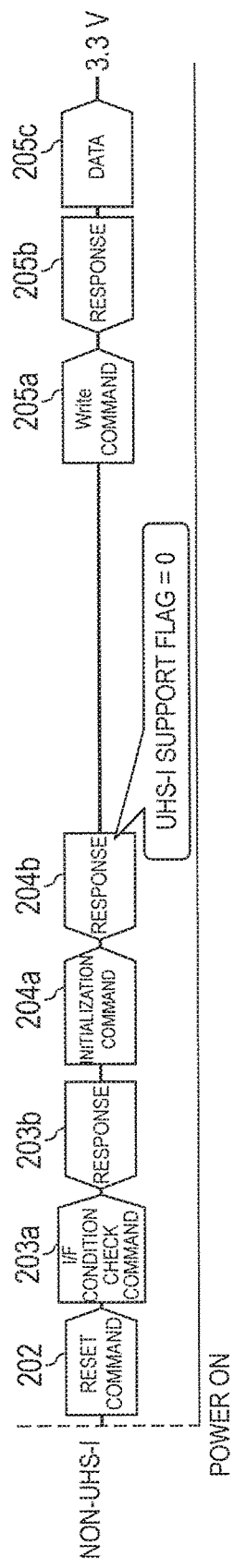
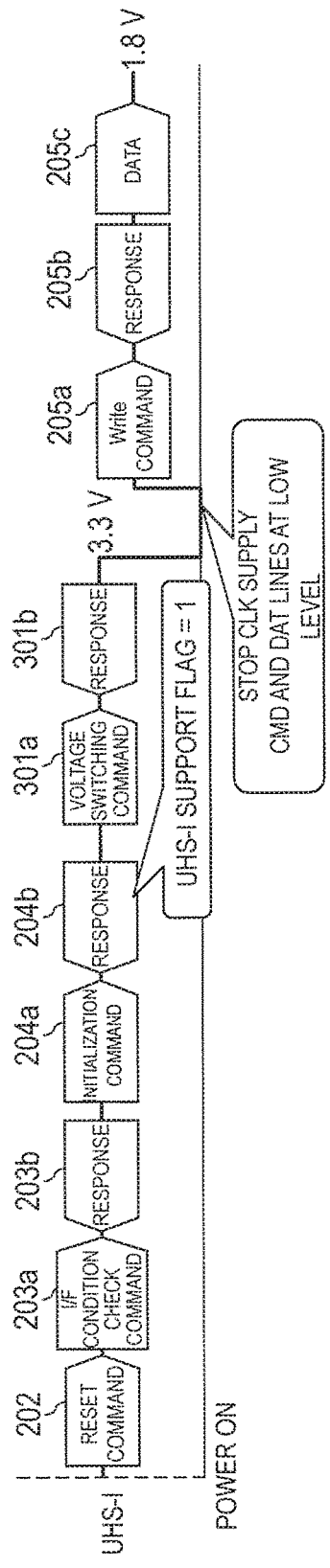
FIG. 3A Prior Art
FIG. 3B Prior Art

FIG. 23

INITIAL STATE OF EACH SIGNAL LINE IN EXISTENT I/F

|  | LEGACY I/F | | UHS-II I/F | |
|---|---|---|---|---|
| CLK LINE | L DRIVE | L | L DRIVE, PULL DOWN, H DRIVE OR PULL UP | L OR H |
| CMD LINE | PULL UP | H | L DRIVE, PULL DOWN, H DRIVE OR PULL UP | L OR H |
| DAT0 LINE | PULL UP | H | L DRIVE OR TRANSMIT DIFFERENTIAL REFERENCE CLOCK | L |
| DAT1 LINE | PULL UP | H | L DRIVE OR TRANSMIT DIFFERENTIAL REFERENCE CLOCK | L |
| DAT2 LINE | PULL UP | H | L DRIVE, PULL DOWN, H DRIVE OR PULL UP | L OR H |
| DAT3 LINE | PULL UP | H | L DRIVE, PULL DOWN, H DRIVE OR PULL UP | L OR H |

L = LOW LEVEL, H = HIGH LEVEL

HOST DEVICE, SLAVE DEVICE, AND REMOVABLE SYSTEM

RELATED APPLICATIONS

This application claims the benefit of Japanese Application No. 2016-000791, filed on Jan. 6, 2016, and Japanese Application No. 2016-234662, filed Dec. 2, 2016, the disclosures of which are incorporated by reference herein.

BACKGROUND

1. Technical Field

The present disclosure relates to a host device and a slave device which are connectable to each other, and further relates to a removable system including the host device and the slave device.

2. Description of the Related Art

In recent years, a slave device such as a card-shaped SD card and a memory stick that includes a non-volatile memory element with large capacity such as flash memory and that is capable of high-speed data processing has been popular in a market. Such a slave device is utilized in a host device usable with the slave device, such as a personal computer, a smart phone, a digital camera, an audio player and a car navigation system.

For example, International Patent Publication No. 2009/107400 discloses a technique for selecting an operating voltage from a plurality of interface voltages in a communication system using a host device and a slave device.

Moreover, Unexamined Japanese Patent Publication No. 2003-337639 discloses a technique for determining an interface circuit to be used in an electronic device (slave device) according to an ON/OFF state of power and according to whether a specific signal line is at a high level or a low level.

SUMMARY

The present disclosure provides a host device to be connected to a slave device by a plurality of interfaces of different maximum voltage levels. The host device supplies power to the slave device, and sequentially transmits via a first signal line a signal of 1.8 V that is a first voltage level and a signal of 0 V that is a second voltage level. Subsequently, when the host device receives via a second signal line the signal of 1.8 V that is the first voltage level, the host device starts communication with the slave device.

Moreover, the present disclosure provides a slave device to be connected to a host device by a plurality of interfaces of different maximum voltage levels. When the slave device receives power from the host device and sequentially receives via a first signal line a signal of 1.8 V that is a first voltage level and a signal of 0 V that is a second voltage level, the slave device transmits via a second signal line the signal of 1.8 V that is the first voltage level. Subsequently, when the slave device receives via the first signal line the signal of 1.8 V that is the first voltage level, the slave device stops the transmission via the second signal line of the signal of 1.8 V that is the first voltage level.

Moreover, the present disclosure provides a removable system including the host device and the slave device.

BRIEF DESCRIPTION OF THE DRAWINGS

FIG. 2 is an explanatory view of an initialization routine of the removable system including the legacy host device and the legacy slave device;

FIGS. 3A and 3B are explanatory views of initialization routines in a non-UHS (Ultra High Speed)-I mode and a UHS-I mode;

FIG. 23 is a view illustrating an initial state of each signal line in an legacy I/F and a UHS-II I/F.

DETAILED DESCRIPTION

Exemplary embodiments will be described in detail below appropriately with reference to the drawings. However, unnecessarily detailed description may be omitted. For example, detailed description about already well-known matters and repetitive description about substantially the same configuration may be omitted. This is because of avoiding unnecessary redundancy in the following description and of facilitating understanding of a person skilled in the art.

Note that the present disclosure provides the accompanying drawings and the following description for understanding of a person skilled in the art, and is not intended by the accompanying drawings and the following description to limit subject matters described in the claims.

1. Problem to be Solved by Removable System According to Present Disclosure

A problem to be solved by a removable system according to the present disclosure will be described first with reference to FIG. 1 to FIG. 6. Note that hereinafter, an interface is appropriately abbreviated as I/F.

1-1. Configurations of Legacy Host Device and Legacy Slave Device

Figure 1:
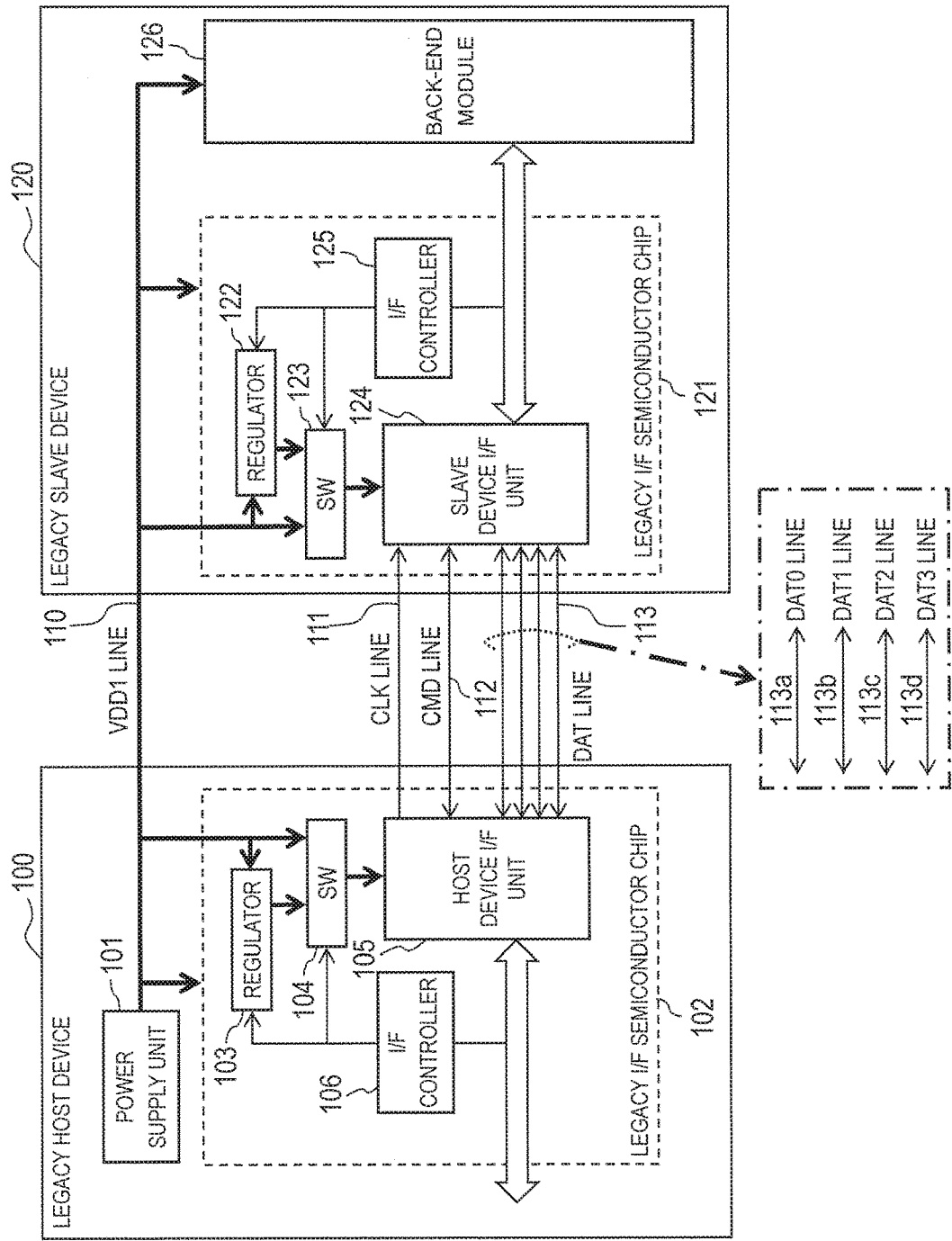
FIG. 1 is a block diagram illustrating a configuration of a removable system including a conventional legacy host device and a legacy slave device.

FIG. 1 is an explanatory block diagram of a configuration of a removable system having detachable legacy slave device 120 connected to legacy host device 100 compatible with a conventional single-end I/F (hereinafter, referred to as a legacy I/F). As illustrated in FIG. 1, legacy host device 100 includes at least power supply unit 101 and legacy I/F semiconductor chip 102. Then, legacy I/F semiconductor chip 102 includes at least regulator 103, SW 104 that is an electric switch of selecting one of two kinds of power input, host device I/F unit 105, and I/F controller 106. Note that regulator 103 can also be disposed outside of legacy I/F semiconductor chip 102.

Legacy host device 100 and legacy slave device 120 are mechanically connected to each other. Moreover, legacy host device 100 is electrically connected to legacy slave device 120 via VDD1 line 110 that is a 3.3 V power line.

Legacy slave device 120 includes at least legacy I/F semiconductor chip 121 and back-end module 126. Note that back-end module 126 refers to a recording medium such as flash memory, and a device such as a radio communication module. Then, legacy I/F semiconductor chip 121 includes at least regulator 122, SW 123, slave device I/F unit 124, and I/F controller 125. Note that regulator 122 can also be disposed outside of legacy I/F semiconductor chip 121.

Host device I/F unit 105 and slave device I/F unit 124 perform signal communication via CLK line 111, CMD line 112, and DAT line 113. Note that DAT line 113 includes four signal lines of DAT0 line 113a, DAT1 line 113b, DAT2 line 113c, and DAT3 line 113d.

FIG. 2 is an explanatory view of a routine performed after power activation in legacy host device 100 and legacy slave device 120. Moreover, FIGS. 3A and 3B are explanatory views of details of a command and a response in two kinds of legacy slave devices 120 (details will be described below).

1-2. Detailed Operations of Legacy Host Device and Legacy Slave Device

Operations performed when legacy slave device 120 is connected to legacy host device 100 will be described below with reference to FIG. 1 to FIG. 3B.

On power activation, 3.3 V power is supplied from power supply unit 101 of legacy host device 100 to legacy I/F semiconductor chip 102, regulator 103, and SW 104, and to legacy slave device 120 via VDD1 line 110.

Legacy I/F semiconductor chip 102 supplies the 3.3 V power supplied from power supply unit 101 to any modules disposed in legacy I/F semiconductor chip 102 so as to make the respective modules operable.

Regulator 103 is a device that appropriately converts a voltage of the supplied power according to an instruction from I/F controller 106 so as to output the voltage. In modes illustrated in FIG. 1 to FIG. 3B, 3.3 V power to be supplied from power supply unit 101 is converted to 1.8 V power by regulator 103.

SW 104 selects any of 3.3 V power to be supplied from power supply unit 101 and 1.8 V power to be supplied from regulator 103 so as to supply the power to host device I/F unit 105. In the modes illustrated in FIG. 1 to FIG. 3B, 3.3 V power is supplied to host device I/F unit 105 immediately after power activation. Accordingly, signal voltages of CLK line 111, CMD line 112, and DAT line 113 to be output from host device I/F unit 105 each become 3.3 V.

On the other hand, the 3.3 V power supplied to legacy slave device 120 via VDD1 line 110 is supplied to legacy I/F semiconductor chip 121, regulator 122, SW 123, and back-end module 126.

Legacy I/F semiconductor chip 121 supplies the supplied 3.3 V power to any modules disposed in legacy I/F semiconductor chip 121 so as to make the respective modules operable. Moreover, the 3.3 V power supplied via VDD1 line 110 is converted to 1.8 V power by regulator 122. Moreover, SW 123 supplies 3.3 V power to slave device I/F unit 124 immediately after power activation.

Signal voltages of CMD line 112 and DAT line 113 to be output from slave device I/F unit 124 each become 3.3 V due to the 3.3 V power supplied to slave device I/F unit 124.

Host device I/F unit 105 of legacy host device 100 is connected to slave device I/F unit 124 of legacy slave device 120 by CLK line 111, CMD line 112, and DAT line 113 including the four lines. On CLK line 111, a clock signal of single-ended signaling is transmitted from legacy host device 100 to legacy slave device 120. On CMD line 112, commands for control of legacy host device 100 on legacy slave device 120 and responses relevant to the respective commands are transmitted by single-ended signaling of a 3.3 V signal. For example, legacy host device 100 transmits the commands to legacy slave device 120, and legacy slave device 120 transmits the responses to legacy host device 100. For this reason, CMD line 112 is of interactive communication.

On the other hand, DAT line 113 is a signal line via which mainly data contents such as a still image and a text is transmitted at a high speed, and includes the four signal lines. A configuration of each signal line is similar to a configuration of CMD line 112.

Legacy host device 100 pulls up CMD line 112 and entire DAT line 113 to a predetermined voltage (normally 3.3 V) by a pull-up resistor (not illustrated) in order to avoid floating of each signal line without legacy slave device 120 being attached. Further, immediately after activation, legacy host device 100 connects DAT3 line 113*d* and VDD1 line 110 by a pull-up resistor (not illustrated) in legacy slave device 120. This can be utilized for detecting whether legacy host device 100 is connected to legacy slave device 120 immediately after activation.

Moreover, on power activation, legacy host device 100 normally does not drive respective terminals of CMD line 112 and DAT line 113 to a low level nor a high level, and brings the terminals into an input state, namely, a high-impedance (Hi-Z; open) state. Therefore, as long as legacy host device 100 does not drive these signal lines, the signal lines transit to the high level by the above-described pull-up resistor along with application of VDD1 (200).

Note that herein, a signal being at the low level refers to a signal having a voltage of 0 V and near 0 V, and normally means 0. On the other hand, a signal being at the high level refers to a signal having a voltage higher than the low level which can be discriminated easily from the low level signal, and normally means 1. Note that at the high level, an absolute voltage value is different between a high voltage signal of 3.3 V (hereinafter, referred to as a 3.3 V signal) and a low voltage signal of 1.8 V (hereinafter, referred to as a 1.8 V signal).

After power activation, host device I/F unit 105 generates a clock of single-ended signaling of the 3.3 V signal by 3.3 V (high voltage) power to be supplied from power supply unit 101 via SW 104. Then, when 1 ms or more passes after a power output from power supply unit 101 is stabilized at 3.3 V, the clock is supplied to slave device I/F unit 124 (201).

Subsequently, legacy host device 100 enters an initialization routine of performing characteristic confirmation and initialization of connected legacy slave device 120. Host device I/F unit 105 first issues reset command 202. Note that a response relevant to the reset command is not present.

Legacy host device 100 then uses I/F controller 106 to generate I/F condition check command 203*a* that is a command for checking an I/F condition of the connected slave device (for example, a compatible power voltage), and transmits the command to slave device I/F unit 124 via CMD line 112.

I/F condition check command 203*a* is transmitted to I/F controller 125 via slave device I/F unit 124. I/F controller 125 interprets command contents, generates relevant response 203*b* and returns the response to legacy host device 100 via CMD line 112.

Legacy host device 100 then transmits initialization command 204*a* to legacy slave device 120 via CMD line 112. As with the case of I/F condition check command 203*a*, legacy slave device 120 interprets command contents, generates relevant response 204*b* and returns the response to legacy host device 100 via CMD line 112.

Subsequently, legacy host device 100 issues Write command 205*a* through a predetermined initialization process that will not be described in detail. At this time, after legacy host device 100 receives response 205*b* transmitted from legacy slave device 120, legacy host device 100 transmits via DAT line 113 data 205*c* to be written in back-end module 126 of legacy slave device 120.

Now, two kinds of I/Fs of non-UHS-I and UHS-I are present in the legacy I/F. The non-UHS-I is an I/F where each of signal voltages of CLK line 111, CMD line 112, and DAT line 113 is always the 3.3 V signal. On the other hand, the UHS-I uses the 3.3 V signal immediately after power activation and switches the 3.3 V signal to the 1.8 V signal halfway.

The legacy slave device that supports only the non-UHS-I is called a non-UHS-I slave device, and the legacy slave device that supports the UHS-I and the non-UHS-I is called a UHS-I slave device. Legacy host device 100 discriminates by a UHS-I support flag whether the connected slave device is the non-UHS-I slave device or the UHS-I slave device. Note that any of power voltages to be supplied to the non-UHS-I slave device and the UHS-I slave device via a power line is of 3.3 V high voltage power.

FIGS. 3A and 3B are explanatory views of a difference in initialization between the non-UHS-I slave device and the UHS-I slave device. Note that in FIGS. 3A and 3B, the CMD line and the DAT line are illustrated as one signal line in order to avoid complication of the figures.

Initialization command 204*a* illustrated in FIG. 2 includes a UHS-I support confirmation bit by which whether the UHS-I slave device is connected is confirmed. The host device that supports the UHS-I sets the UHS-I support confirmation bit to 1.

I/F controller 125 of legacy slave device 120 that has received initialization command 204*a* returns response 204*b* including at least the UHS-I support flag and an initialization completion flag, and starts initialization of back-end module 126. Legacy slave device 120 can receive initialization command 204*a* many times during the initialization of back-end module 126 and until back-end module 126 shifts to next processing after initialization completion. Then, the initialization completion flag of response 204*b* is set to 0 during the initialization, and is set to 1 after the initialization completion. Moreover, when the UHS-I support confirmation bit of initialization command 204*a* is set to 1, the UHS-I support flag of the non-UHS-I slave device becomes 0, and the UHS-I support flag of the UHS-I slave device becomes 1.

When legacy host device 100 receives response 204*b* including the initialization completion flag 1 within predetermined time after initialization command 204*a* is issued (for example, 64 clock periods), legacy host device 100 determines that the initialization of legacy slave device 120 is completed.

When the UHS-I support flag of response 204*b* is set to 0, legacy host device 100 determines that connected legacy slave device 120 is the non-UHS-I slave device. In this case, any of a clock to be transmitted via CLK line 111, various commands and responses to be transmitted via CMD line 112, and data to be transmitted via DAT line 113 between legacy host device 100 and legacy slave device 120 is realized by the 3.3 V signal. In FIG. 3A, any of Write command 205*a*, response 205*b*, and data (contents data) 205*c* is transmitted by the 3.3 V signal.

A communication mode illustrated in FIG. 3A is called a non-UHS-I mode.

On the other hand, when the UHS-I support flag of response 204*b* is set to 1, legacy host device 100 determines that connected legacy slave device 120 is the UHS-I slave device.

In this case, legacy host device 100 transmits voltage switching command 301*a* to legacy slave device 120.

I/F controller 125 that has received voltage switching command 301*a* returns relevant response 301*b*, and instructs such that all signal lines of CMD line 112 and DAT 113 are driven to the low level. This instruction is because of avoiding a fact that when a signal voltage is not at the low level, there is a possibility that the signal voltage may become higher than a power voltage on switching of supply power and destroy an I/O buffer.

I/F controller 106 of the host device that has detected the above-described instruction temporally (5 ms or more) stops the supply of the clock via CLK line 111. During this, legacy host device 100 activates regulator 103 according to the instruction from I/F controller 106, such that 1.8 V low voltage power (hereinafter, referred to as 1.8 V power) can be supplied. Subsequently, I/F controller 106 instructs SW 104 to supply to host device I/F unit 105 the 1.8 V power that is an output from regulator 103. Note that regulator 103 of legacy host device 100 may be activated in an earlier stage. Accordingly, signal voltages of CLK line 111, CMD line 112, and DAT line 113 to be output from host device I/F unit 105 each become 1.8 V.

Similarly, I/F controller 125 in legacy slave device 120 activates regulator 122 and instructs SW 123 to supply to slave device I/F unit 124 the 1.8 V power that is an output from regulator 122 such that the 1.8 V power can be supplied. Accordingly, signal voltages of CMD line 112, and DAT line 113 to be output from slave device I/F unit 124 each become 1.8 V.

Subsequently, in legacy host device 100 and legacy slave device 120, a clock by the 1.8 V signal is transmitted to CLK line 111. Moreover, any of various commands and responses by the 1.8 V signal and data to be transmitted via DAT line 113 is transmitted by the 1.8 V signal by using CMD line 112. In FIG. 3B, any of Write command 205*a*, response 205*b*, and data 205*c* is transmitted by the 1.8 V signal.

A communication mode illustrated in FIG. 3B is called a UHS-I mode.

Details of a switching sequence of the signal voltages along with voltage switching command 301*a* are disclosed in Patent Literature 1.

1-3. Configurations of UHS-II Host Device and UHS-II Slave Device

In the above-described legacy I/F of single-ended signaling, from a viewpoint of signal quality and EMI (Electro-Magnetic Interference), a limit of a transmission speed per signal line is about 200 Mbit/sec. Accordingly, a differential serial signal I/F that is called a UHS-II has been introduced into an SD card in order to realize a higher transmission speed.

Figure 4:
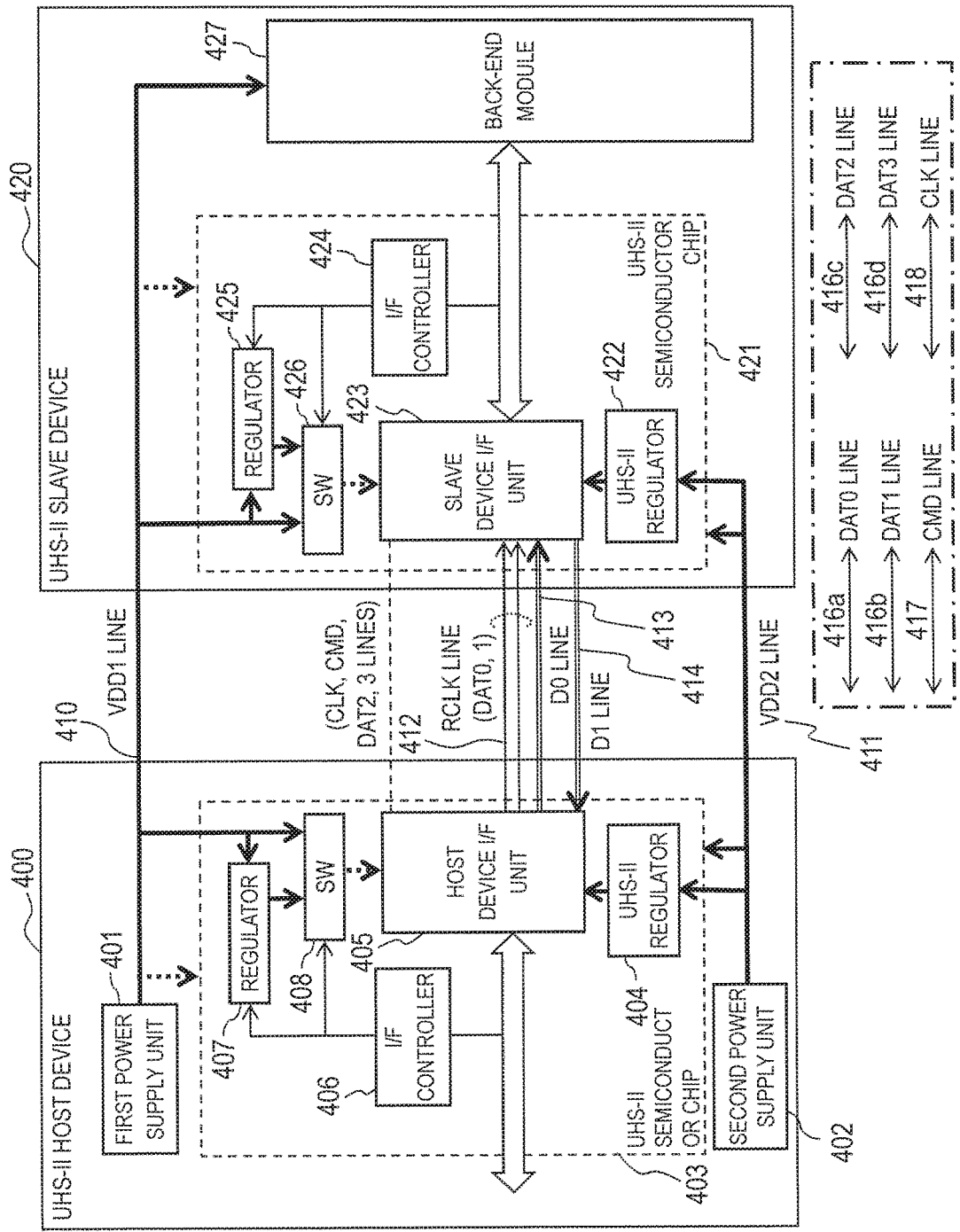
FIG. 4 is a block diagram illustrating a configuration of a removable system including a conventional UHS-II host device and a UHS-II slave device.

FIG. 4 is an explanatory block diagram of a configuration of a removable system having detachable UHS-II slave device 420 connected to UHS-II host device 400. As illustrated in FIG. 4, UHS-II host device 400 includes at least first power supply unit 401, second power supply unit 402, and UHS-II semiconductor chip 403. Then, UHS-II semiconductor chip 403 includes at least UHS-II regulator 404, host device I/F unit 405, I/F controller 406, regulator 407, and SW 408. Regulator 407 and SW 408 have functions equivalent to the functions of regulator 103 and SW 104 in FIG. 1, respectively. Note that UHS-II regulator 404 can also be disposed outside of UHS-II semiconductor chip 403.

UHS-II host device 400 and UHS-II slave device 420 are mechanically connected to each other. Moreover, UHS-II host device 400 is electrically connected to UHS-II slave device 420 via VDD1 line 410 that is a 3.3 V power line and also via VDD2 line 411 that is a 1.8 V power line.

UHS-II slave device 420 includes at least UHS-II semiconductor chip 421 and back-end module 427. Then, UHS-II semiconductor chip 421 includes at least UHS-II regulator 422, slave device I/F unit 423, I/F controller 424, regulator 425, and SW 426. Regulator 425 and SW 426 have functions equivalent to the functions of regulator 122 and SW 123 in FIG. 1, respectively. Note that UHS-II regulator 422 can also be disposed outside of UHS-II semiconductor chip 421.

Host device I/F unit 405 and slave device I/F unit 423 perform signal communication via RCLK line 412, D0 line 413 and D1 line 414. D0 line 413 and D1 line 414 are used only in the UHS-II. Any of RCLK line 412, D0 line 413, and D1 line 414 is a differential serial signal having voltage amplitude of 0.4 V.

RCLK line 412 includes DAT0 line 416*a* and DAT1 line 416*b* in the legacy I/F.

Note that when legacy slave device 120 is connected to UHS-II host device 400 or when UHS-II slave device 420 is connected to legacy host device 100, UHS-II host device 400 and UHS-II slave device 420 also include terminals to be used in the legacy I/F in order that legacy slave device 120 and UHS-II host device 400 or UHS-II slave device 420 and legacy host device 100 are communicable by using at least the legacy I/F.

Moreover, CMD line 417, CLK line 418, DAT2 line 416*c*, and DAT3 line 416*d* are not used in the UHS-II, but are electrically connected such that UHS-II host device 400 or UHS-II slave device 420 is also operable by the legacy I/F as described above. On the other hand, legacy host device 100 and legacy slave device 120 that have no UHS-II function include no terminal of VDD2 line 411, D0 line 413 nor D1 line 414 to be used only in the UHS-II.

Figure 5:
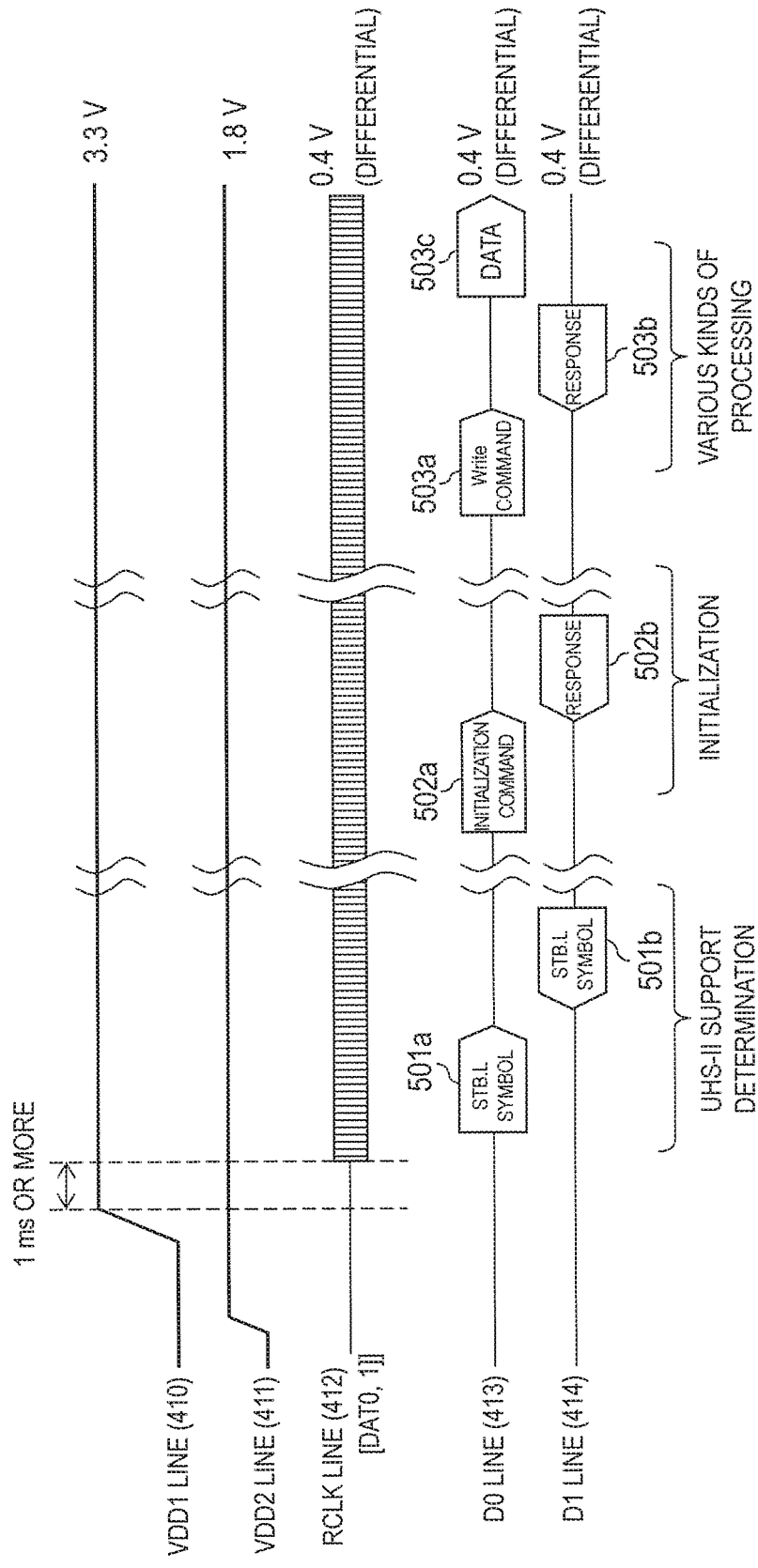
FIG. 5 is an explanatory view of a case where UHS-II initialization succeeds in an initialization routine of the removable system including the UHS-II host device and the UHS-II slave device.
Figure 6:
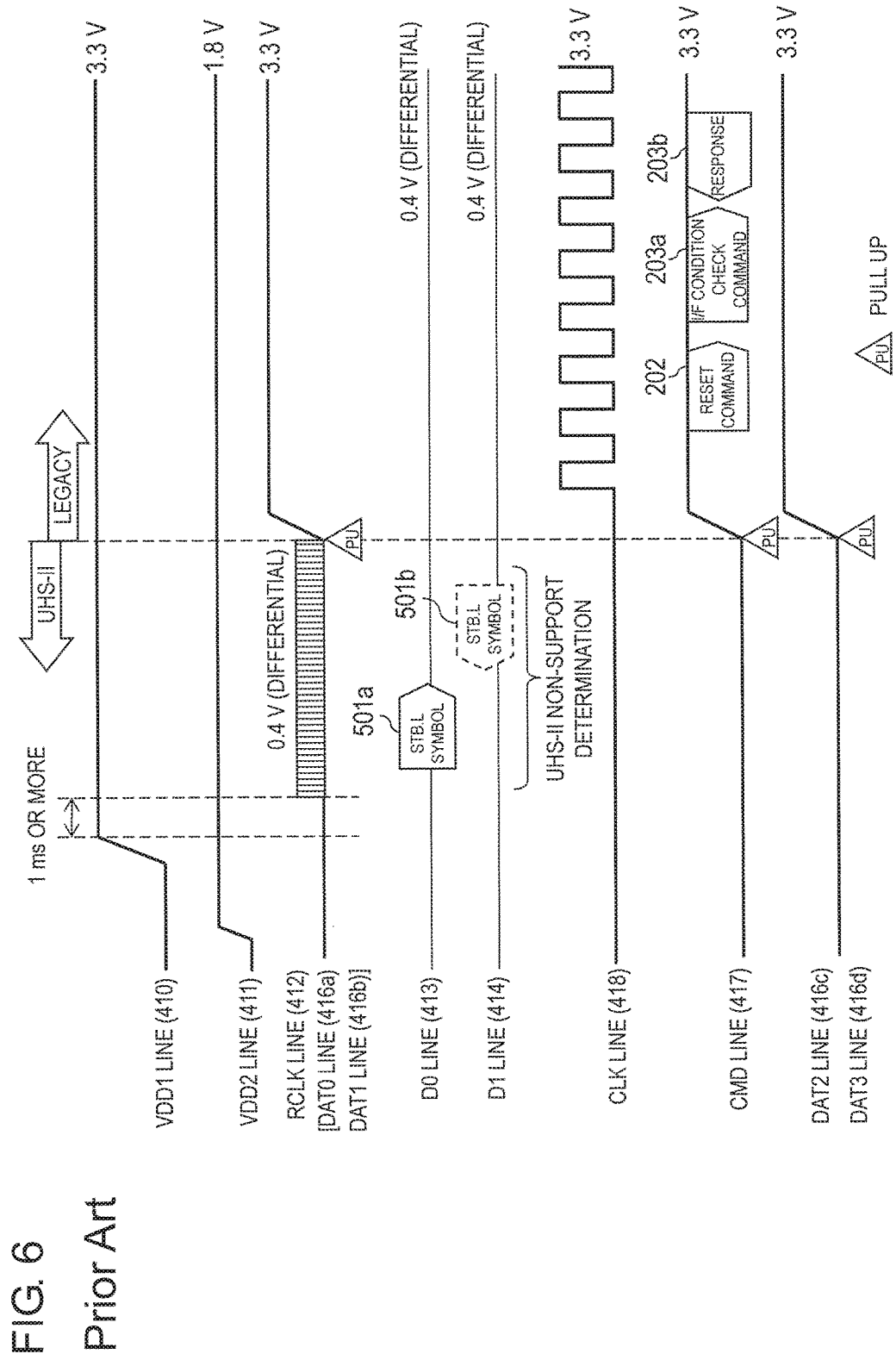
FIG. 6 is an explanatory view of a case where the UHS-II initialization fails in the initialization routine of the removable system including the UHS-II host device and the UHS-II slave device.

FIG. 5 and FIG. 6 are explanatory views of a routine performed after power activation in UHS-II host device 400 and UHS-II slave device 420.

1-4. Detailed Operations of UHS-II Host Device and UHS-II Slave Device

Operations performed when UHS-II slave device 420 is connected to UHS-II host device 400 will be described below with reference to FIG. 4 to FIG. 6.

FIG. 5 is a case where UHS-II initialization succeeds.

On the other hand, FIG. 6 is a sequence view in a case where the UHS-II initialization fails due to a certain cause. Note that FIG. 6 also applies to a case where UHS-II host device 400 is connected to legacy slave device 120 described with reference to FIG. 1.

On power activation, UHS-II host device 400 then supplies 3.3 V power from first power supply unit 401 to regulator 407 and SW 408. Moreover, UHS-II host device 400 further supplies 1.8 V power from second power supply unit 402 to UHS-II semiconductor chip 403 and UHS-II regulator 404.

UHS-II semiconductor chip 403 supplies the supplied 1.8 V power to any modules disposed in UHS-II semiconductor chip 403 so as to make the respective modules operable. Note that the power to be supplied to UHS-II semiconductor chip 403 may be 3.3 V power to be supplied via VDD1 line 410 instead of the above-described 1.8 V power.

UHS-II regulator 404 is a device that appropriately converts a voltage of the supplied 1.8 V power so as to output the voltage, and in FIG. 4 to FIG. 6, UHS-II regulator 404 drops the voltage to 0.4 V that is amplitude of a differential signal so as to supply the voltage to host device I/F unit 405. Accordingly, RCLK line 412 and D0 line 413 to be output from host device I/F unit 405 become 0.4 V differential serial signals. Note that when VDD2 is supplied to UHS-II regulator 404, namely, when UHS-II host device 400 intends to execute the UHS-II initialization, regulator 407 is not activated according to an instruction from I/F controller 406, and also no power is supplied to SW 408.

On the other hand, the 3.3 V power supplied to UHS-II slave device 420 via VDD1 line 410 is supplied to regulator 425, SW 426, and back-end module 427. Moreover, the 1.8 V power supplied to UHS-II slave device 420 via VDD2 line 411 is supplied to UHS-II semiconductor chip 421 and UHS-II regulator 422. UHS-II semiconductor chip 421 supplies the supplied 1.8 V power to any modules disposed in UHS-II semiconductor chip 421 so as to make the respective modules operable. Moreover, the 1.8 V power supplied to UHS-II regulator 422 is dropped to 0.4 V and then the 0.4 V power is supplied to slave device I/F unit 423. Accordingly, D1 line 414 to be output from slave device I/F unit 423 becomes the 0.4 V differential serial signal. Note that when VDD2 is supplied to UHS-II regulator 422, namely, when initialization is performed by the UHS-II I/F, no power is supplied to SW 426 according to an instruction from I/F controller 424.

A differential reference clock of differential serial signaling is transmitted from UHS-II host device 400 to UHS-II slave device 420 in one direction by RCLK line 412 (including two signal lines of DAT0 line 416a and DAT1 line 416b). Moreover, a differential serial signal (a command and data, as well as a symbol including a specific bit string) is transmitted principally from UHS-II host device 400 to UHS-II slave device 420 by D0 line 413 (including two signal lines). Further, a differential serial signal (a response and data, as well as a symbol including a specific bit string) is transmitted principally from UHS-II slave device 420 to UHS-II host device 400 by D1 line 414 (including two signal lines).

In FIG. 5, UHS-II host device 400 supplies 3.3 V power via the VDD1 line, and 1.8 V power via the VDD2 line to UHS-II slave device 420. Then, when 1 ms or more passes after a power output from UHS-II host device 400 is stabilized at VDD1=3.3 V and at VDD2=1.8 V, a differential reference clock is transmitted via RCLK line 412. Note that the defined time from the stabilization of VDD1 and VDD2 to the transmission of the differential reference clock is not limited to 1 ms or more.

Subsequently, UHS-II host device 400 transmits STB.L symbol 501a generated by I/F controller 406 to UHS-II slave device 420 via D0 line 413. I/F controller 424 of UHS-II slave device 420 that has correctly recognized STB.L symbol 501a generates STB.L symbol 501b within predetermined time (for example, 200 µs), and transmits STB.L symbol 501b to UHS-II host device 400 via D1 line 414.

When UHS-II host device 400 can receive STB.L symbol 501b via D1 within predetermined time T, it is determined that the UHS-II initialization can be performed (UHS-II support determination).

Subsequently, UHS-II host device 400 executes a series of processing (503a to 503c) of various commands such as Write through predetermined UHS-II initialization processing not illustrated in detail (initialization command 502a, relevant response 502b and the like).

When UHS-II host device 400 uses DAT0 line 416a and DAT1 line 416b as RCLK line 412, UHS-II host device 400 disconnects a pull-up resistor for these lines and drives these lines to the low level until RCLK is supplied. Moreover, when UHS-II host device 400 executes the UHS-II initialization, DAT2 line 416c, DAT3 line 416d, CMD line 417, and CLK line 418 are fixed at the low level or the high level, and floating of these lines is avoided. In realization of the high level, there are a case where a signal line is brought into a Hi-Z state and pulled up (connected to a predetermined power line by a pull-up resistor) to realize the high level, and a case where UHS-II host device 400 drives a signal line to the high level and transmits 1 to realize the high level. Moreover, in realization of the low level, there are a case where a signal line is brought into the Hi-Z state and pulled down (connected to a ground by a pull-down resistor) to realize the low level, and a case where UHS-II host device 400 drives a signal line to the low level and transmits 0 to realized the low level.

On the other hand, as illustrated in FIG. 6, when UHS-II host device 400 fails to receive STB.L symbol 501b in predetermined time (200 µs) after UHS-II host device 400 transmits STB.L symbol 501a so as to execute the UHS-II initialization, UHS-II host device 400 determines that the UHS-II initialization cannot be performed (UHS-II non-support determination). At this time, UHS-II host device 400 can shift to legacy I/F initialization without stopping the supply of VDD1 and VDD2 (without carrying out a power cycle).

Specifically, when UHS-II host device 400 fails to receive STB.L symbol 501b via D1 line 414, UHS-II host device 400 stops the supply of RCLK being transmitted via RCLK line 412. Then, UHS-II host device 400 brings CMD line 417 and the entire DAT line from DAT0 line 416a to DAT3 line 416d into the Hi-Z state, and pulls up the lines. Accordingly, these signal lines transit to the high level. At this time, UHS-II host device 400 switches a supply source of power to be supplied to host device I/F unit 405 from UHS-II regulator 404 to SW 408. Note that at this time, regulator 407 needs to have already been activated.

Subsequently, after a clock is supplied via CLK line 418, UHS-II host device 400 sequentially transmits reset command 202 and I/F condition check command 203a as with the sequence in FIG. 2. Then, UHS-II slave device 420 transmits any response 203b relevant to I/F condition check command 203a by the 3.3 V signal, and executes the legacy I/F initialization. Note that when regulator 425 receives voltage switching command 301a supplied from UHS-II host device 400 after the legacy initialization, regulator 425 is activated according to an instruction from I/F controller 424.

A semiconductor chip for a host device has been difficult to be compatible with a high voltage signal such as 3.3 V due to a finer semiconductor process. For this reason, introduction of, for example, an I/F having an input/output limited to the low voltage signal of 1.8 V or less has been considered in a removable system including an SD card (slave device) and a host device compatible with the SD card.

On the other hand, a removable system including a SD card and a host device compatible with the SD card has already been very widely popular. In order to replace a form factor such as disposition of a signal line and a size and shape of a slave device with a new form factor, a host device and a slave device each need new design, and a newly designed host device and slave device cannot be utilized in a host device and slave device that have already been popular in a market. For this reason, it has been considered to continue to utilize a conventional interface.

Here, the UHS-II has signal amplitude of 0.4 V that is a voltage level significantly lower than 3.3 V, and the UHS-II satisfies a requirement of being a low voltage signal. However, in order to support the UHS-II while the legacy I/F is maintained, it is considered, for example, to increase a number of terminals of a semiconductor chip of each of the host device and the slave device. Accordingly, the increase in the number of terminals leads to cost increase in the semiconductor chip and eventually in the host device and the slave device. Therefore, in addition to a conventional legacy I/F and UHS-II, introduction of an I/F similar to the legacy I/F (hereinafter, this I/F is described as LV-I) has been considered in a protocol that includes only the 1.8 V low voltage signal without using the 3.3 V signal and that includes initialization.

Figure 7:
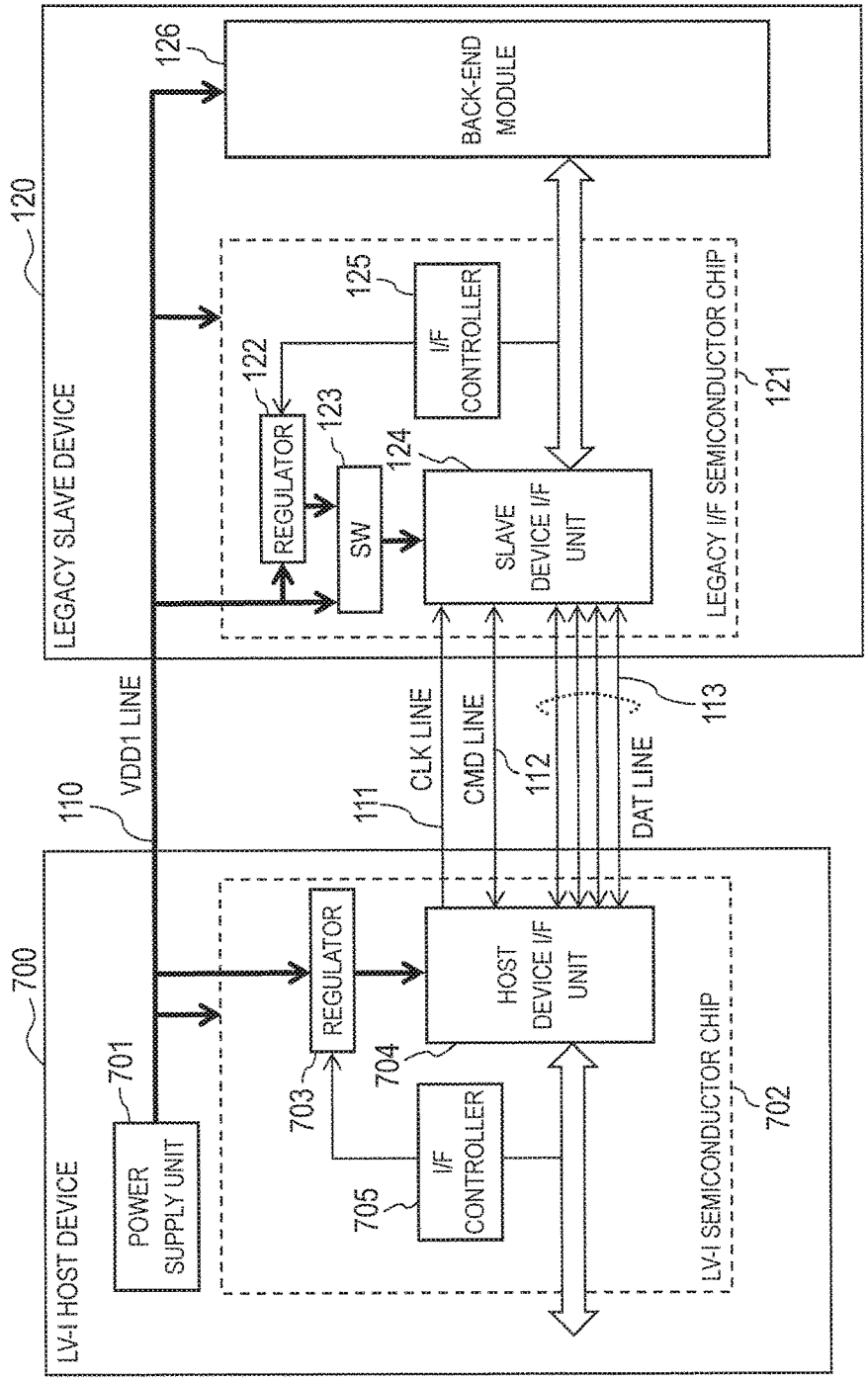
FIG. 7 is a block diagram illustrating a configuration of a removable system including an LV (Low Voltage)-I host device that is a conventional legacy host device having an output signal of 1.8 V, and a legacy slave device.

It is considered based on the above-described background that an LV-I compatible host device having an input/output of legacy I/F semiconductor chip 102 limited to the 1.8 V signal is introduced into legacy host device 100 illustrated in FIG. 1. FIG. 7 is an explanatory block diagram of a configuration of a removable system including LV-I host device 700 having an input/output limited to the 1.8 V signal, and legacy slave device 120.

LV-I host device 700 includes at least power supply unit 701 and LV-I semiconductor chip 702. Then, LV-I semiconductor chip 702 includes at least regulator 703, host device I/F unit 704, and I/F controller 705.

A difference between legacy host device 100 in FIG. 1 and LV-I host device 700 in FIG. 7 is that an upper limit of an input signal withstand voltage of LV-I semiconductor chip 702 is 1.8 V.

However, in the removable system illustrated in FIG. 7, the following problem arises.

Since the 3.3 V signal cannot be handled in LV-I host device 700, regulator 703 is activated immediately after LV-I host device 700 is activated, and 1.8 V power is always supplied to host device I/F unit 704.

On the other hand, when 3.3 V power compatible legacy slave device 120 that is a product having already been very popular in a market is connected to LV-I host device 700, 3.3 V power is supplied to legacy slave device 120 via VDD1 line 110. As described above, immediately after power activation, 3.3 V power is supplied to slave device I/F unit 124 in legacy slave device 120. For this reason, legacy slave device 120 returns response 203b to I/F condition check command 203a received first time after power activation, to LV-I host device 700 by the 3.3 V signal. Accordingly, the 3.3 V signal is input to LV-I semiconductor chip 702 of LV-I host device 700, and a problem of destruction of LV-I semiconductor chip 702 arises.

The above-described problem can be avoided by proceeding initialization only when the slave device connected to the LV-I host device is compatible with the LV-I I/F, and by carrying out no initialization otherwise.

As a method in which the host device detects characteristics of the slave device, there is a method for reading a register mounted to the slave device. However, normally, the register of the slave device is enabled after initialization completion using the initialization command (204a or 502a) as a trigger. For this reason, this method cannot be applied to the problem to be solved by the present disclosure in which the host device needs to detect the characteristics of the slave device before the initialization is carried out.

In order to solve this problem, before the host device issues a command, the host device and the slave device need to control a specific signal line in a state different from the state in the case of the conventional legacy initialization or the UHS-II initialization so as to detect each other.

Thus, the problem to be solved by the present disclosure is recognized in a process of development of a removable system, and the present disclosure provides a solution to the problem. Details of the solution to the problem will be described specifically below. Hereinafter, first and second exemplary embodiments will be described as examples where technical ideas of the solution to the problem are embodied.

Figure 8:
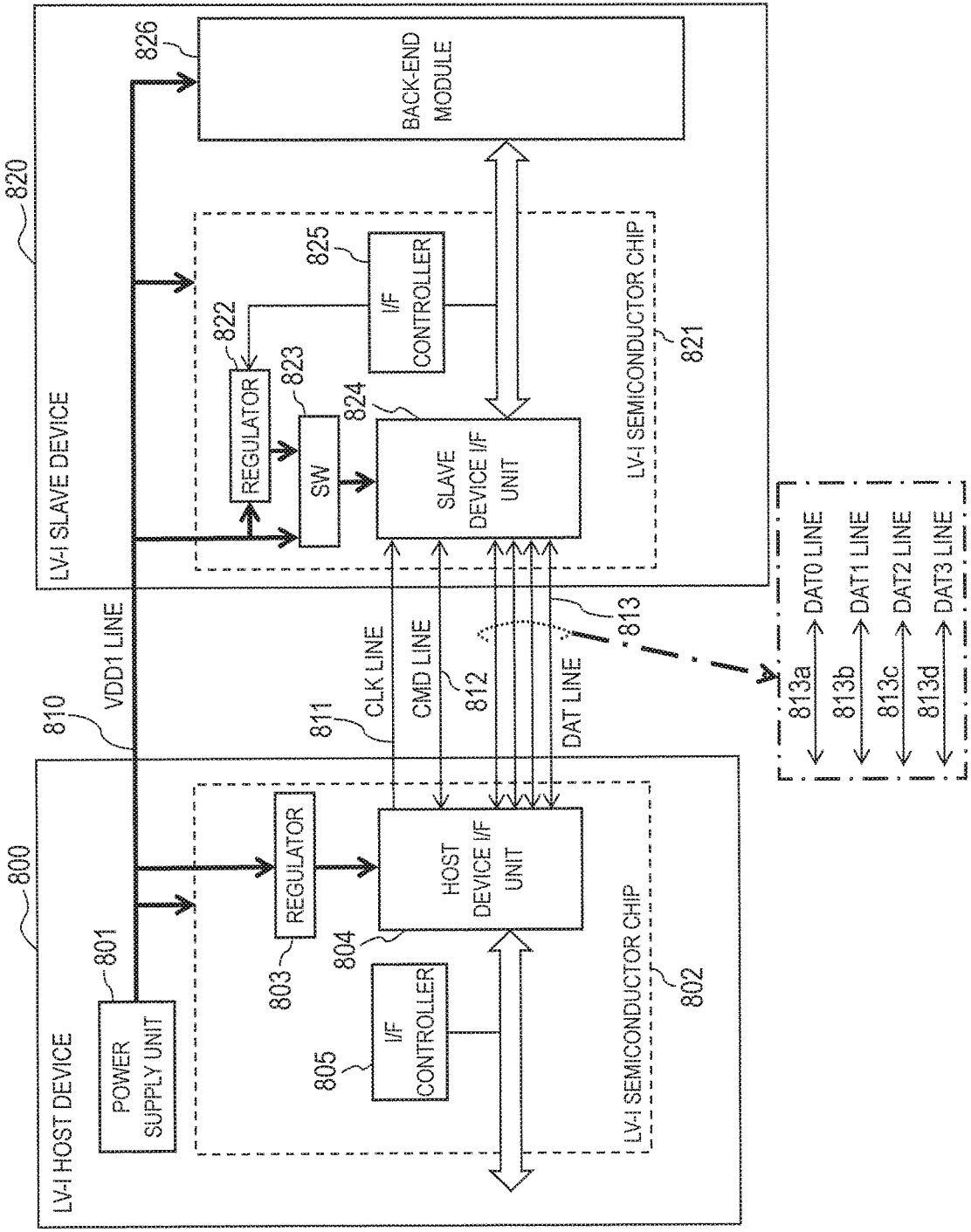
FIG. 8 is a block diagram illustrating a configuration of a removable system including an LV-I host device and an LV-I slave device according to a first exemplary embodiment of the present disclosure.

2. Configuration and Operations of Removable System According to First Exemplary Embodiment 2-1. Configuration FIG. 8 is an explanatory block diagram of a configuration of a removable system having detachable LV-I slave device 820 connected to LV-I host device 800 of the present disclosure. LV-I host device 800 includes at least power supply unit 801 and LV-I semiconductor chip 802 as illustrated in FIG. 8. Then, LV-I semiconductor chip 802 includes regulator 803, host device I/F unit 804, and I/F controller 805. Host device I/F unit 804 has at least a function of a clock signal transmitter that transmits a clock signal, a function of a transmitter that transmits data on DAT1 line 813b that is a first signal, and a function of a receiver that receives data on DAT2 line 813c that is a second signal.

Note that an upper limit of an input signal withstand voltage of LV-I semiconductor chip 802 of LV-I host device 800 is 1.8 V. Moreover, regulator 803 can also be disposed outside of LV-I semiconductor chip 802. Further, the host device according to this exemplary embodiment includes power supply unit 801 and LV-I semiconductor chip 802. However, the host device according to this exemplary embodiment can be realized by LV-I semiconductor chip 802 alone, as long as power can be supplied to LV-I semiconductor chip 802.

LV-I host device 800 and LV-I slave device 820 are mechanically connected to each other. Moreover, LV-I host device 800 is electrically connected to LV-I slave device 820 via VDD1 line 810 as with the removable system described with reference to FIG. 1.

LV-I slave device 820 includes at least LV-I semiconductor chip 821 and back-end module 826. Then, LV-I semiconductor chip 821 includes at least regulator 822, SW 823, slave device I/F unit 824, and I/F controller 825. Slave device I/F unit 824 has at least a function of a clock signal receiver that receives a clock signal, a function of a receiver that receives data on DAT1 line 813b that is the first signal, and a function of a transmitter that transmits data on DAT2 line 813c that is the second signal.

Note that regulator 822 can also be disposed outside of LV-I semiconductor chip 821. Further, the slave device according to this exemplary embodiment includes LV-I semiconductor chip 821 and back-end module 826. However, the slave device according to this exemplary embodiment can be realized by LV-I semiconductor chip 821 alone.

Host device I/F unit 804 and slave device I/F unit 824 perform signal communication via CLK line 811, CMD line 812, and DAT line 813 as with the removable system described with reference to FIG. 1. Note that DAT line 813 includes four signal lines of DAT0 line 813a, DAT1 line 813b, DAT2 line 813c, and DAT3 line 813d.

Figure 9:
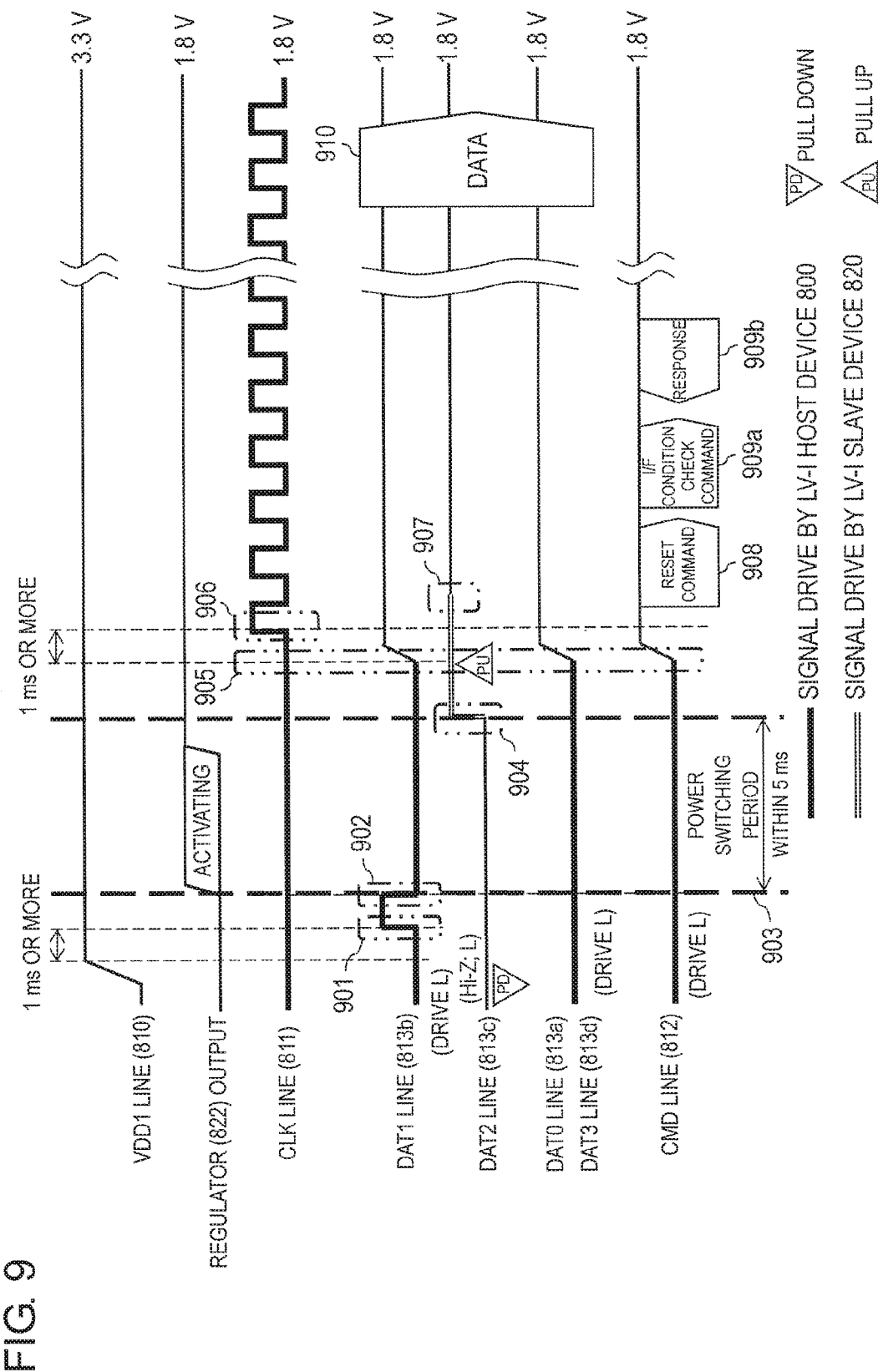
FIG. 9 is an explanatory view of an initialization routine of the removable system including the LV-I host device and the LV-I slave device according to the first exemplary embodiment of the present disclosure.
Figure 10:
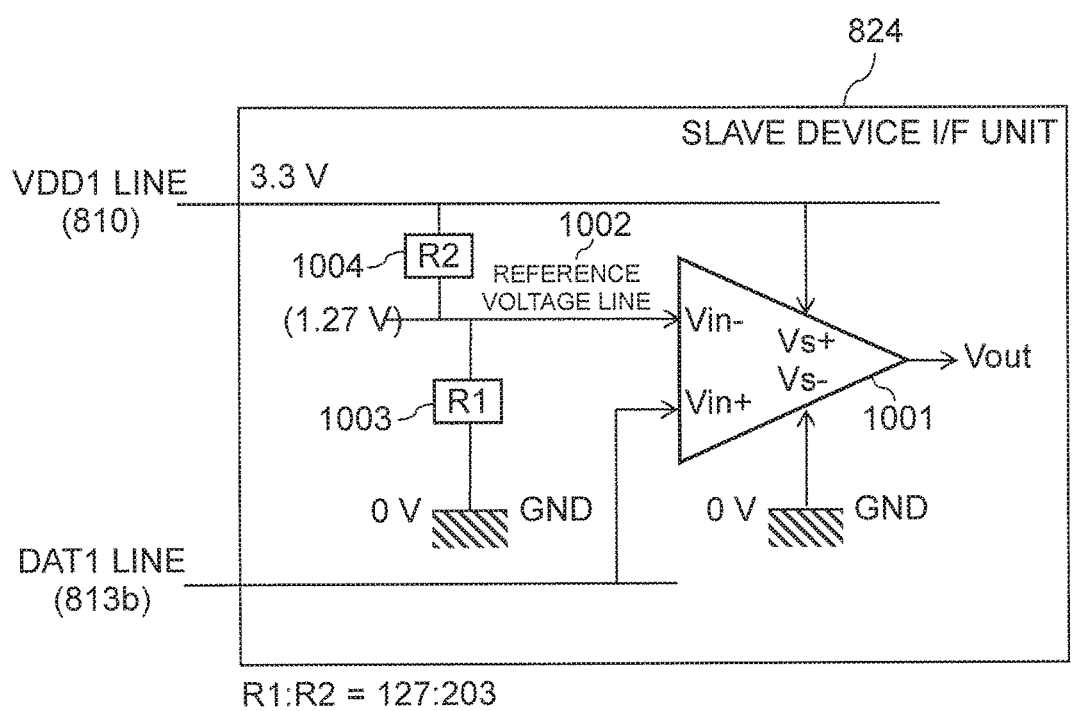
FIG. 10 is an explanatory view of a circuit implementation example for detecting a high level signal of 1.8 V when power of 3.3 V is supplied to a slave device I/F unit in the first exemplary embodiment of the present disclosure.

FIG. 9 is an explanatory view of an operation performed after power activation in the removable system including LV-I host device 800 and LV-I slave device 820 according to this exemplary embodiment. Moreover, FIG. 10 is a view illustrating a configuration example for detecting a high level signal of 1.8 V in LV-I slave device 820 according to this exemplary embodiment.

2-2. Detailed Operations

Operations performed when LV-I slave device 820 is connected to LV-I host device 800 will be described below with reference to FIG. 8 to FIG. 10.

In LV-I slave device 820 according to this exemplary embodiment, before power supply, all DAT0 line 813*a*, DAT1 line 813*b*, DAT2 line 813*c*, DAT3 line 813*d*, and CMD line 812 are in a Hi-Z state.

On power activation, 3.3 V power is supplied from power supply unit 801 of LV-I host device 800 to LV-I semiconductor chip 802 and regulator 803, and further to LV-I slave device 820 via VDD1 line 810. LV-I semiconductor chip 802 supplies the supplied 3.3 V power to any modules disposed in LV-I semiconductor chip 802 so as to make the respective modules operable.

Regulator 803 converts the supplied 3.3 V power to 1.8 V so as to supply the 1.8 V power to host device I/F unit 804. Accordingly, signal voltages of CLK line 811, CMD line 812, and DAT line 813 to be output from host device I/F unit 804 each become 1.8 V.

On the other hand, the 3.3 V power supplied to LV-I slave device 820 via VDD1 line 810 is supplied to LV-I semiconductor chip 821, regulator 822, SW 823, and back-end module 826.

LV-I semiconductor chip 821 supplies the supplied 3.3 V power to any modules disposed in LV-I semiconductor chip 821 so as to make the respective modules operable. Moreover, regulator 822 is a device that converts the supplied 3.3 V power to 1.8 V power so as to output the 1.8 V power.

SW 823 is a device that outputs to slave device I/F unit 824 any of the 3.3 V power to be directly supplied from VDD1 line 810 and the 1.8 V power that is an output from regulator 822, according to an instruction from I/F controller 825. Immediately after the power is supplied from LV-I host device 800, the 3.3 V power to be directly supplied from VDD1 line 810 is being supplied to slave device I/F unit 824.

As with the removable system described with reference to FIG. 1, host device I/F unit 804 of LV-I host device 800 is connected to slave device I/F unit 824 of LV-I slave device 820 by CLK line 811, CMD line 812, and DAT line 813 including the four lines.

Next, an operation performed when LV-I host device 800 intends to perform initialization by an LV-I will be described.

LV-I host device 800 pulls down DAT2 line 813*c* to 0 V by a pull-down resistor (not illustrated) in LV-I host device 800, and then brings the DAT2 line 813*c* into the Hi-Z state. Accordingly, DAT2 line 813*c* transits to a low level.

Moreover, LV-I host device 800 pulls up DAT0 line 813*a*, DAT1 line 813*b*, DAT3 line 813*d*, CMD line 812 to a predetermined voltage by a pull-up resistor (not illustrated) in LV-I host device 800, and then drives these lines to the low level. Accordingly, these signals reach the low level. Note that a voltage of a signal to be pulled up should not exceed the upper limit of the input signal withstand voltage of LV-I semiconductor chip 802. In this exemplary embodiment, LV-I host device 800 pulls up these signals to 1.8 V.

Further, LV-I host device 800 drives CLK line 811 to the low level.

LV-I host device 800 supplies 3.3 V power to LV-I slave device 820 via VDD1 line 810. Then, when 1 ms or more passes after power output VDD1 from LV-I host device 800 is stabilized at 3.3 V, LV-I host device 800 drives DAT1 line 813*b* to a high level of 1.8 V (901). Note that the time until DAT1 line 813*b* is brought into the high level in short time after the stabilization of VDD1 is defined 1 ms or more as an example, and may have another numerical value.

Subsequently, LV-I host device 800 again drives DAT1 line 813*b* to the low level within short time (for example, 10 μs) (902).

When slave device I/F unit 824 in LV-I slave device 820 detects that DAT1 line 813*b* transits from the low level to the high level after activation and that DAT1 line 813*b* subsequently transits from the high level to the low level, slave device I/F unit 824 recognizes that initialization is the initialization by the LV-I, and notifies I/F controller 825 of the initialization. At this time, LV-I slave device 820 enters power switching period 903.

When LV-I slave device 820 enters power switching period 903, I/F controller 825 activates regulator 822. When a 1.8 V power output from regulator 822 is stabilized, I/F controller 825 instructs SW 823 to switch the power to be supplied to slave device I/F unit 824 from 3.3 V to 1.8 V. Accordingly, signal voltages of CMD line 812 and DAT line 813 to be output from slave device I/F unit 824 each become 1.8 V. Note that during power switching period 903, all CLK line 811, CMD line 812, and DAT line 813 are at the low level. Accordingly, a signal voltage becomes higher than a power voltage on power switching, and a possibility of destruction of an I/O buffer can be avoided.

Subsequently, slave device I/F unit 824 drives DAT2 line 813*c* to the high level of 1.8 V (904), and accordingly power switching period 903 ends. The operation at 904 is an operation in which LV-I slave device 820 notifies LV-I host device 800 of a fact that the LV-I initialization is acceptable.

Slave device I/F unit 824 needs to execute the operation during power switching period 903, namely, within predetermined time from timing 902 to timing 904, for example, within 5 ms. Note that since DAT2 line 813*c* is in the Hi-Z state in LV-I host device 800 as described above, there is no problem even when LV-I slave device 820 drives DAT2 line 813*c* to the high level, and since a signal is the 1.8 V signal, host device I/F unit 804 is prevented from being destroyed.

When host device I/F unit 804 detects that DAT2 line 813*c* is at the high level at timing 904, host device I/F unit 804 notifies I/F controller 805 of the detection. At this time, I/F controller 805 stops the drive of CMD line 812, DAT0 line 813*a*, DAT1 line 813*b*, and DAT3 line 813*d*, and brings these lines into the Hi-Z state (905). At this time, CMD line 812, DAT0 line 813*a*, DAT1 line 813*b* and DAT3 line 813*d* transit to the high level by a pull-up resistor (not illustrated) of LV-I host device 800. Further, I/F controller 805 changes pulling-down of DAT2 line 813*c* to pulling-up to 1.8 V at timing 905. At this time, since DAT2 line 813*c* is driven to the high level of 1.8 V by LV-I slave device 820, DAT2 line 813*c* remains at the high level of 1.8 V.

Further, when 1 ms or more passes after timing 905, host device I/F unit 804 starts to supply a clock of 1.8 V amplitude to LV-I slave device 820 via CLK line 811 (906).

When slave device I/F unit 824 detects that at least one of CMD line 812, DAT0 line 813*a*, DAT1 line 813*b*, and DAT3 line 813*d* reaches the high level, slave device I/F unit 824 stops the drive of DAT2 line 813*c* (907). At this time, DAT2 line 813*c* remains at the high level by the pulling-up on a LV-I host device 800 side. Note that a similar effect can also be obtained in a case where the drive of DAT2 line 813*c* is stopped when the clock of 1.8 V amplitude is detected.

When predetermined time passes after LV-I host device 800 starts to supply the clock at timing 906, I/F controller 805 transmits reset command 908 via CMD line 812, and then I/F condition check command 909a to LV-I slave device 820. A parameter including a check bit that indicates compatibility with the 1.8 V signal is multiplexed on I/F condition check command 909a.

LV-I slave device 820 that has received I/F condition check command 909a confirms the parameter multiplexed on I/F condition check command 909a. LV-I slave device 820 confirms the parameter, and accordingly LV-I slave device 820 can double-check that the connected host device is LV-I host device 800.

Subsequently, LV-I slave device 820 transmits relevant response 909b to LV-I host device 800 via CMD line 812. After this process, the initialization by the LV-I I/F and data exchange by data 910 are carried out. Note that before the communication of data 910 starts, entire DAT line 813 is in the Hi-Z state in both LV-I host device 800 and LV-I slave device 820.

Now, LV-I slave device 820 needs to detect whether DAT1 line 813b is at the high level of 1.8 V, but power supplied to slave device I/F unit 824 is 3.3 V before power switching period 903. For this reason, the high level of 1.8 V cannot be detected in a normal I/O buffer. Thus, a circuit such as a circuit illustrated in FIG. 10 is introduced into slave device I/F unit 824.

A signal branched from DAT1 line 813b is supplied to a Vin+ terminal of comparator 1001. Moreover, reference voltage line 1002 is input to a Vin− terminal of comparator 1001. Reference voltage line 1002 is connected to GND (ground) via resistor R1 (1003), and to VDD1 line 810 via resistor R2 (1004). The 3.3 V power is supplied to VDD1 line 810. For this reason, when a resistance value ratio between R1 (1003) and R2 (1004) is set to 127:203, a signal of 1.27 V is always supplied to reference voltage line 1002. Note that the voltage of the signal to be supplied to reference voltage line 1002 is set to 1.27 V because a lower limit value of the voltage of the 1.8 V signal to be input to the slave device I/F unit is 1.27 V.

Since DAT1 line 813b is at the low level (0 V) on power activation, 0 V signal is supplied to Vin+. Therefore, output Vout of comparator 1001 reaches the low level of 0 V (because Vs− is grounded).

Now, when LV-I host device 800 supplies the high level signal of 1.8 V via DAT1 line 813b and a voltage of DAT1 line 813b becomes higher than 1.27 V, Vout reaches a high level of 3.3 V (because 3.3 V power is supplied to Vs+). The high level of 3.3 V of Vout is detected, and accordingly slave device I/F unit 824 can recognize that DAT1 line 813b is at the high level.

Similarly, when LV-I host device 800 supplies a low level signal via DAT1 line 813b and the DAT1 line becomes lower than an electrical potential of 1.27 V, Vout reaches the low level. The low level of Vout is detected, and accordingly slave device I/F unit 824 can recognize that DAT1 line 813b is at the low level.

Note that in FIG. 10, VDD1 that is 3.3 V power actually fluctuates from 2.7 V to 3.6 V. Accordingly, values of resistor R1 (1003) and resistor R2 (1004) should actually be determined also in consideration of the fluctuation in the above-described power voltage.

Meanwhile, before power switching period 903, the 3.3 V power is supplied to slave device I/F unit 824. At this time, when the high level signal of 1.8 V is supplied to slave device I/F unit 824 via DAT1 line 813b, the I/O buffer incorporated in slave device I/F unit 824 reaches an intermediate potential state. When the above-described intermediate potential state continues for long time, there is a possibility that a through current adversely affect LV-I slave device 820. For this reason, a period during which 1.8 V is set as the high level before power switching period 903 is preferably as short as possible in order to notify LV-I slave device 820 of a fact that the initialization is the LV-I initialization.

Note that in FIG. 8, the timing of activating regulator 822 is time when DAT1 line 813b transits from the high level to the low level (902), but the activation may be started immediately after the 3.3 V power to be supplied via VDD1 line 810 is stabilized. In this case, the timing of driving DAT2 line 813c to the high level (904) starts early, and slave device I/F unit 824 can shorten time for the initialization by the LV-I I/F as a whole.

2-3. Effect

According to the first exemplary embodiment of the present disclosure, after the supply of VDD1 that is 3.3 V power, LV-I host device 800 drives DAT1 line 813b to the low level in short time after driving DAT1 line 813b to the high level. Accordingly, LV-I host device 800 notifies LV-I slave device 820 of start of the initialization by the LV-I I/F. Since such signal control is carried out only in a case of the LV-I I/F, LV-I slave device 820 switches the power to be supplied to slave device I/F unit 824 from 3.3 V to 1.8 V, and then drives DAT2 line 813c to the high level.

Then, LV-I host device 800 that has detected that DAT2 line 813c reaches the high level detects that the slave device is LV-I slave device 820. Accordingly, each of the response to be received via CMD line 812 and the data to be received via DAT line 813 is ensured to be the 1.8 V signal. Therefore, even when LV-I host device 800 continues subsequent processing, no high voltage signal of 3.3 V is supplied to LV-I host device 800. For this reason, host device I/F unit 804 having the upper limit of the input signal withstand voltage of 1.8 V is prevented from being destroyed.

Note that in this exemplary embodiment, LV-I host device 800 makes DAT1 line 813b transit to the high level only once, but LV-I host device 800 may adopt a method in which LV-I host device 800 repeats the transition to the high level at a plurality of predetermined times, and when DAT2 line 813c reaches the high level within 5 ms after the last transition from the high level to the low level, the connected slave device is compatible with the LV-I I/F. Accordingly, LV-I slave device 820 can more securely detect that the initialization is the LV-I I/F initialization.

Note that in this exemplary embodiment, when LV-I slave device 820 notifies of a fact that LV-I slave device 820 supports the LV-I I/F, LV-I slave device 820 drives DAT2 line 813c to the high level at timing 904. Instead of the above, it can also be considered to adopt a method in which LV-I slave device 820 connects DAT2 line 813c to 1.8 V power (for example, an output of regulator 822) in LV-I slave device 820 via a pull-up resistor, namely, a method in which LV-I slave device 820 pulls up DAT2 line 813c by 1.8 V. However, DAT2 line 813c takes longer time to reach the high level by this method than by driving DAT2 line 813c. Moreover, even when the pulling-up is performed on a LV-I slave device 820 side, there is a possibility that DAT2 line 813c do not to reach 1.27 V that is a threshold of the high level of the 1.8 V signal, depending on a pull-down resistance value of DAT2 line 813c in LV-I host device 800. In this case, although the connected slave device is LV-I slave device 820, LV-I host device 800 determines that the slave device is incompatible with the LV-I I/F, and interrupts the initialization as described below in a fourth exemplary embodiment. In this case, although a customer has purchased the host device and the slave device both of which are compatible with the LV-I, there is a concern that the above-described combination cannot be utilized. For this reason, when LV-I slave device 820 notifies of a fact that LV-I slave device 820 supports the LV-I I/F, DAT2 line 813c is preferably driven to the high level at timing 904.

Figure 11:
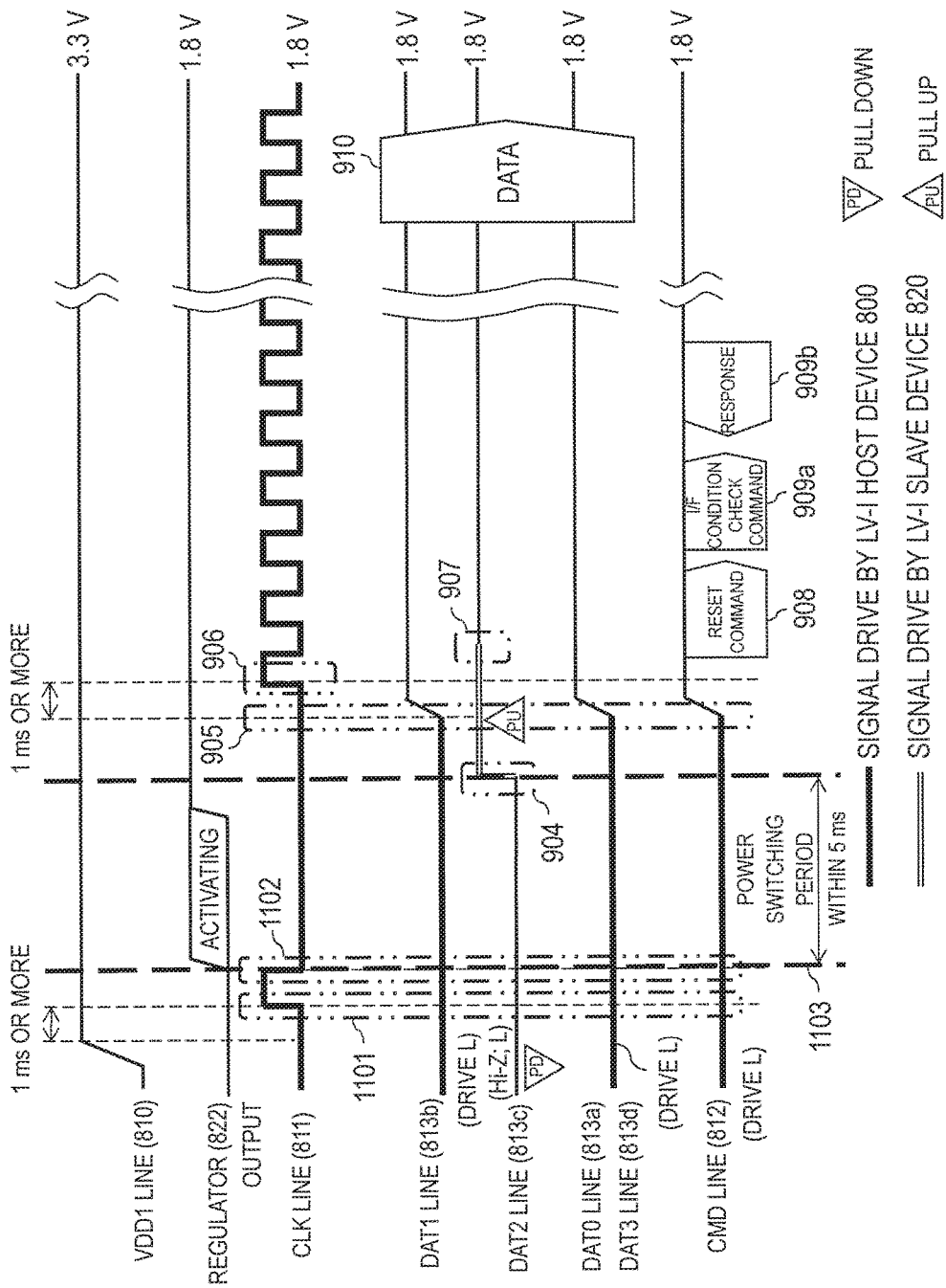
FIG. 11 is an explanatory view of an initialization routine of the removable system including the LV-I host device and the LV-I slave device according to a second exemplary embodiment of the present disclosure.

3. Configuration and Operations of Removable System According to Second Exemplary Embodiment 3-1. Configuration FIG. 11 is an explanatory view of another operation performed after power activation and different from the operation in the first exemplary embodiment, in the removable system according to the first exemplary embodiment including LV-I host device 800 and LV-I slave device 820 illustrated in FIG. 8.

3-2. Detailed Operations

A difference from the first exemplary embodiment in operations performed when LV-I slave device 820 is connected to LV-I host device 800 will mainly be described below with reference to FIG. 8 and FIG. 11.

In LV-I slave device 820 according to this exemplary embodiment, before power supply, all DAT0 line 813a, DAT1 line 813b, DAT2 line 813c, DAT3 line 813d, CLK line 811, and CMD line 812 are in a Hi-Z state.

Next, when LV-I host device 800 intends to perform initialization by an LV-I, LV-I host device 800 pulls down DAT2 line 813c to 0 V by a pull-down resistor (not illustrated) in LV-I host device 800, and then brings DAT2 line 813c into the Hi-Z state. Accordingly, DAT2 line 813c transits to a low level.

Moreover, LV-I host device 800 pulls up DAT0 line 813a, DAT1 line 813b, DAT3 line 813d, and CMD line 812 to a predetermined voltage by a pull-up resistor (not illustrated) in LV-I host device 800, and drives these lines to the low level. Accordingly, these signals reach the low level. Note that a voltage of a signal to be pulled up should not exceed an upper limit of an input signal withstand voltage of LV-I semiconductor chip 802. In this exemplary embodiment, LV-I host device 800 pulls up these signals to 1.8 V.

Further, LV-I host device 800 drives CLK line 811 to the low level.

LV-I host device 800 supplies 3.3 V power to LV-I slave device 820 via VDD1 line 810. Then, when 1 ms or more passes after power output VDD1 from LV-I host device 800 is stabilized at 3.3 V, LV-I host device 800 drives CLK line 811 to a high level of 1.8 V (1101). Note that the time until CLK line 811 is brought into the high level in short time after VDD1 is stabilized is defined 1 ms or more as an example, and may have another numerical value.

Subsequently, LV-I host device 800 again drives CLK line 811 to the low level when 15 μs or more passes (1102). This is because a lowest frequency of a clock signal to be supplied immediately after legacy host device 100 is activated is 100 kHz, and a longest high level duration of the clock signal is 5 μs. Accordingly, when the time during which CLK line 811 is brought into the high level immediately after LV-I host device 800 is activated is sufficiently longer than 5 μs, LV-I slave device 820 can discriminate the initialization from legacy I/F initialization.

When slave device I/F unit 824 in LV-I slave device 820 detects that CLK line 811 transits from the low level to the high level of 1.8 V and that when 15 μs or more passes, CLK line 811 transits from the high level of 1.8 V to the low level, and when slave device I/F unit 824 detects that all DAT line 813 and CMD line 812 are at the low level at timing 1101 and timing 1102, slave device I/F unit 824 recognizes that the initialization is the initialization by the LV-I, and LV-I slave device 820 notifies I/F controller 825 of the initialization. At this time, LV-I slave device 820 enters power switching period 1103.

Subsequent operations are similar to the operations in the first exemplary embodiment.

3-3. Effect

According to the second exemplary embodiment of the present disclosure, LV-I host device 800 performs the low level drive in short time after performing the high level drive of 1.8 V via CLK line 811 instead of DAT1 line 813b, and accordingly LV-I host device 800 can notify LV-I slave device 820 of start of the initialization by the LV-I I/F. At this time, as with the first exemplary embodiment, LV-I slave device 820 switches power to be supplied to slave device I/F unit 824 from 3.3 V to 1.8 V, and then drives DAT2 line 813c to the high level.

Moreover, LV-I host device 800 maintains CMD line 812 and entire DAT line 813 at the low level until at least LV-I slave device 820 drives DAT2 line 813c to the high level. For this reason, LV-I slave device 820 confirms that CMD line 812 and entire DAT line 813 are at the low level at the timing when CLK line 1212 changes from the low level to the high level of 1.8 V after power activation (1101), and at the timing when CLK line 1212 again changes to the low level (1102). Accordingly, LV-I slave device 820 can securely detect that the connected host device is the LV-I host device, and LV-I slave device 820 that also has a function of a legacy I/F can be prevented from erroneously outputting a 3.3 V signal to LV-I host device 800.

4. Configuration and Operations of Removable System According to Third Exemplary Embodiment 4-1. Configuration FIG. 12 is an explanatory block diagram of a configuration of a removable system having detachable LV-I slave device 1220 connected to LV-I host device 1200 of the present disclosure.

Figure 12:
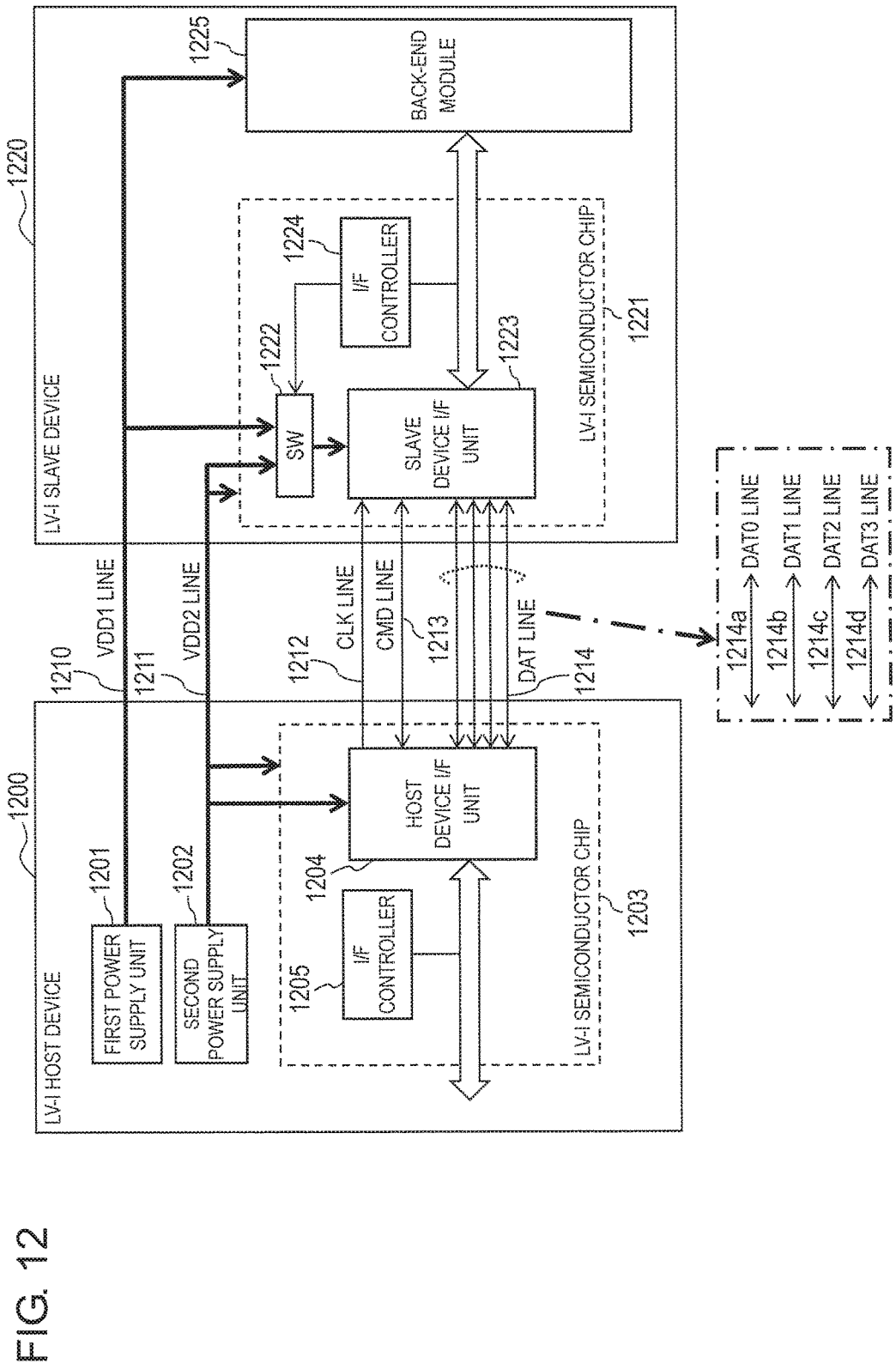
FIG. 12 is a block diagram illustrating a configuration of a removable system including an LV-I host device and an LV-I slave device according to a third exemplary embodiment of the present disclosure.

As illustrated in FIG. 12, LV-I host device 1200 includes at least first power supply unit 1201, second power supply unit 1202, and LV-I semiconductor chip 1203. Then, LV-I semiconductor chip 1203 includes host device I/F unit 1204 and I/F controller 1205. Note that an upper limit of an input signal withstand voltage of LV-I semiconductor chip 1203 of LV-I host device 1200 is 1.8 V. LV-I host device 1200 and LV-I slave device 1220 are mechanically connected to each other. Moreover, LV-I host device 1200 is electrically connected to LV-I slave device 1220 via VDD1 line 1210 and VDD2 line 1211 as with the removable system described with reference to FIG. 4.

LV-I slave device 1220 includes at least LV-I semiconductor chip 1221 and back-end module 1225. Then, LV-I semiconductor chip 1221 includes at least SW 1222, slave device I/F unit 1223, and I/F controller 1224. Note that SW 1222 can also be disposed inside of slave device I/F unit 1223 or outside of LV-I semiconductor chip 1221.

Host device I/F unit 1204 and slave device I/F unit 1223 perform signal communication via CLK line 1212, CMD line 1213, and DAT line 1214 as with the removable system described with reference to FIG. 8. Note that DAT line 1214 includes four signal lines of DAT0 line 1214a, DAT1 line 1214b, DAT2 line 1214c, and DAT3 line 1214d.

A difference between LV-I host device 800 and LV-I slave device 820 according to the first exemplary embodiment and LV-I host device 800 and LV-I slave device 820 according to this exemplary embodiment is that LV-I host device 800 and LV-I slave device 820 according to the first exemplary embodiment have no VDD2 terminal while LV-I host device 800 and LV-I slave device 820 according to this exemplary embodiment each have a VDD2 terminal.

Figure 13:
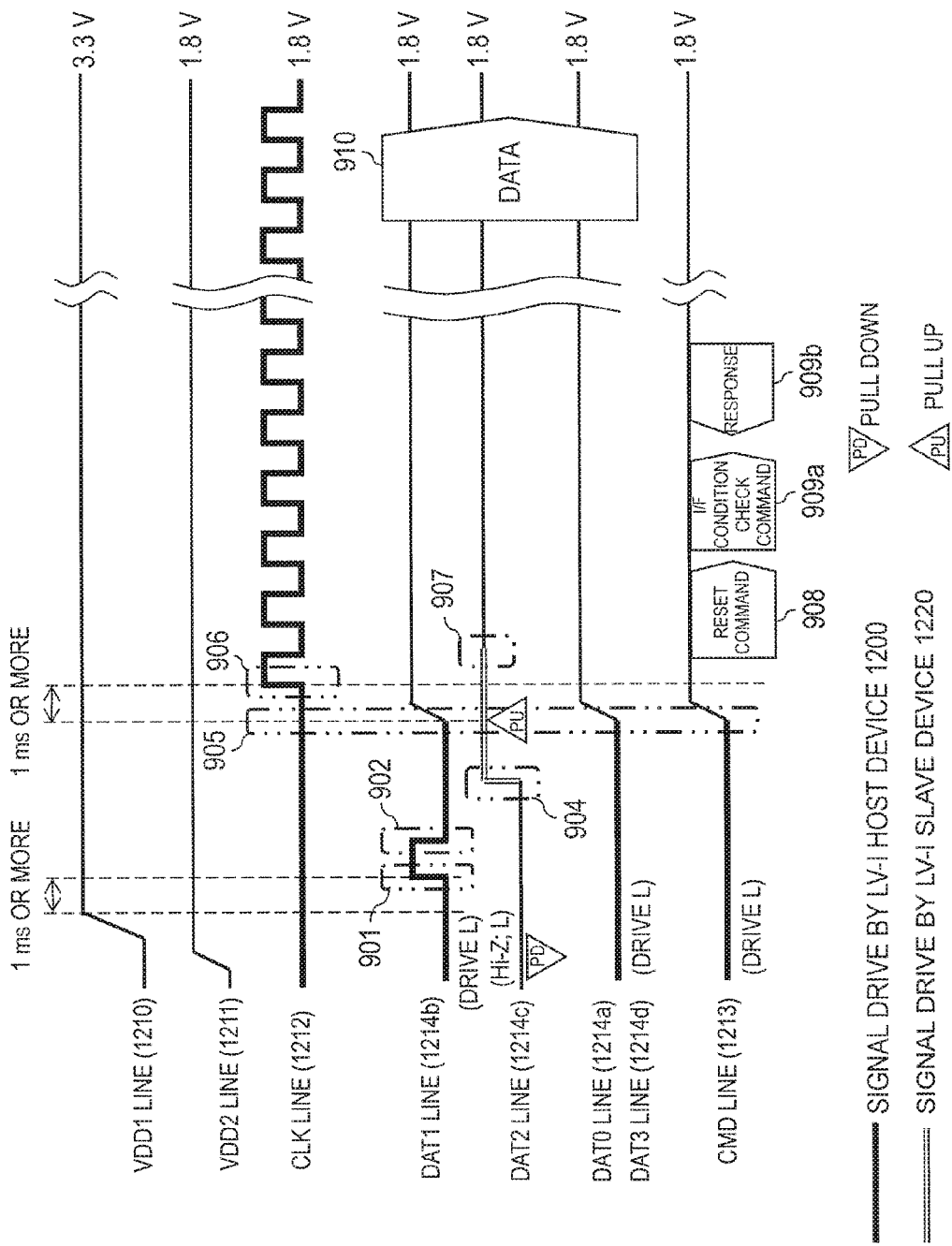
FIG. 13 is an explanatory view of an initialization routine of the removable system including the LV-I host device and the LV-I slave device according to the third exemplary embodiment of the present disclosure.

FIG. 13 is an explanatory view of an operation performed after power activation in the removable system including LV-I host device 1200 and LV-I slave device 1220 according to this exemplary embodiment.

4-2. Detailed Operations

A difference from the first exemplary embodiment in operations performed when LV-I slave device 1220 is connected to LV-I host device 1200 will be described below with reference to FIG. 12 and FIG. 13.

On power activation, 3.3 V power is supplied from first power supply unit 1201 of LV-I host device 1200 to LV-I slave device 1220 via VDD1 line 1210. In addition, 1.8 V power is supplied from second power supply unit 1202 of LV-I host device 1200 to LV-I semiconductor chip 1203 and host device I/F unit 1204 of LV-I host device 1200, and further to LV-I slave device 1220 via VDD2 line 1211.

LV-I semiconductor chip 1203 supplies the supplied 1.8 V power to any modules disposed in LV-I semiconductor chip 1203 so as to the respective modules operable. Moreover, the above-described 1.8 V power is also supplied to host device I/F unit 1204. Accordingly, signal voltages of CLK line 1212, CMD line 1213, and DAT line 1214 to be output from host device I/F unit 1204 each become 1.8 V.

On the other hand, the 3.3 V power supplied to LV-I slave device 1220 via VDD1 line 1210 is supplied to SW 1222 and back-end module 1225 in LV-I semiconductor chip 1221. In addition, the 1.8 V power supplied from LV-I host device 1200 via VDD2 line 1211 is supplied to LV-I semiconductor chip 1221 and SW 1222. LV-I semiconductor chip 1221 supplies the supplied 1.8 V power to any modules disposed in LV-I semiconductor chip 1221 so as to make the respective modules operable. Note that the power to be supplied to LV-I semiconductor chip 1221 may be the 3.3 V power to be supplied via VDD1 line 1210.

Immediately after power activation, power to be supplied to slave device I/F unit 1223 via SW 1222 is 3.3 V.

In FIG. 13, as with FIG. 9, when LV-I host device 1200 intends to perform initialization by an LV-I, DAT2 line 1214c is brought into a Hi-Z state and then is pulled down, and CLK line 1212, CMD line 1213, DAT0 line 1214a, DAT1 line 1214b, and DAT3 line 1214d are pulled up and then driven to a low level. Then, LV-I host device 1200 supplies 3.3 V power via VDD1 line 1210, and 1.8 V power via VDD2 line 1211 to LV-I slave device 1220. Then, when 1 ms or more passes after power output VDD1 from LV-I host device 1200 is stabilized at 3.3 V, LV-I host device 1200 drives DAT1 line 1214b to a high level of 1.8 V (901), and again drives DAT1 line 1214b to the low level within short time (for example, 10 μs) (902).

When slave device I/F unit 1223 detects that DAT1 line 1214b transits from the low level to the high level and subsequently transits from the high level to the low level, slave device I/F unit 1223 instructs SW 1222 to perform switching such that 1.8 V power is supplied to slave device I/F unit 1223.

Subsequently, as with the first exemplary embodiment, slave device I/F unit 824 drives DAT2 line 1214c to the high level of 1.8 V (904), and accordingly notifies LV-I host device 1200 of a fact that the LV-I initialization is acceptable. Operations following 904 are similar to the operations in the first exemplary embodiment.

4-3. Effect

It is understood according to the third exemplary embodiment that even when the configuration in which LV-I host device 1200 supplies to LV-I slave device 1220 VDD2 that is 1.8 V power is added to the first exemplary embodiment, a similar effect can be obtained.

Moreover, one of characteristics in the third exemplary embodiment is that regulators 803 and 822 in the first exemplary embodiment are unnecessary. Accordingly, in the third exemplary embodiment, power switching period 903 that is necessary in the first exemplary embodiment can be made approximately zero, and there is an effect of enabling shortening of LV-I initialization time. Moreover, the above-described characteristic can reduce power consumption associated with activation of the regulators in both LV-I host device 1200 and LV-I slave device 1220. Accordingly, particularly in a mobile removable system where an LV-I host device is driven by a battery, there is, for example, an effect of enabling lengthening of an operation duration.

Note that in this exemplary embodiment, as with the first exemplary embodiment, LV-I host device 1200 carries out the control of driving DAT1 line 1214b to the high level of 1.8 V and subsequently again driving DAT1 line 1214b to the low level. Instead of the above, as with the second exemplary embodiment, LV-I host device 1200 may adopt a method in which LV-I host device 1200 performs control of driving CLK line 1212 to the high level of 1.8 V and subsequently again driving CLK line 1212 to the low level, and LV-I slave device 1220 detects this change. Moreover, as with the second exemplary embodiment, LV-I slave device 1220 confirms that CMD line 1213 and entire DAT line 1214 are at the low level at timing when CLK line 1212 changes from the low level to the high level of 1.8 V immediately after power activation, and timing when CLK line 1212 again changes to the low level. Accordingly, LV-I slave device 1220 can securely detect that the connected host device is the LV-I host device.

5. Configuration and Operations of Removable System According to Fourth Exemplary Embodiment An LV-I host device and an LV-I slave device described below in each of a fourth and subsequent exemplary embodiments will be described assuming that the LV-I host device and the LV-I slave device operate principally based on the contents described in the first exemplary embodiment.

5-1. Configuration

Figure 14:
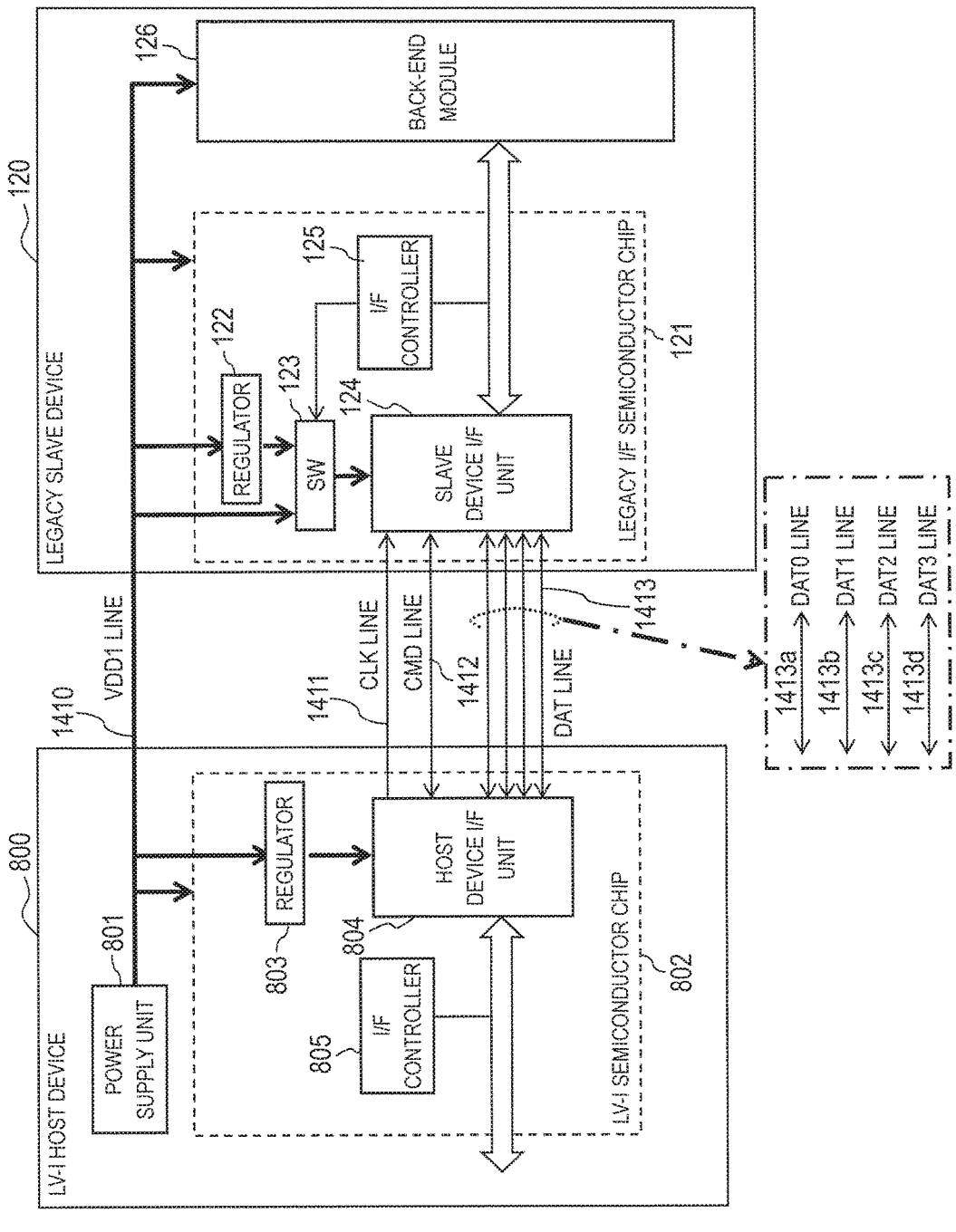
FIG. 14 is a block diagram illustrating a configuration of a removable system including an LV-I host device and a legacy slave device according to a fourth exemplary embodiment of the present disclosure.

FIG. 14 is an explanatory block diagram of a configuration of a removable system having detachable legacy slave device 120 connected to LV-I host device 800 of the present disclosure. Configurations of LV-I host device 800 and legacy slave device 120 are the same as the contents described above.

LV-I host device 800 and legacy slave device 120 are mechanically connected to each other. Moreover, LV-I host device 800 is electrically connected by VDD1 line 1410.

Host device I/F unit 804 and slave device I/F unit 124 perform signal communication via CLK line 1411, CMD line 1412, and DAT line 1413. Note that DAT line 1413 includes four signal lines of DAT0 line 1413a, DAT1 line 1413b, DAT2 line 1413c, and DAT3 line 1413d.

Figure 15:
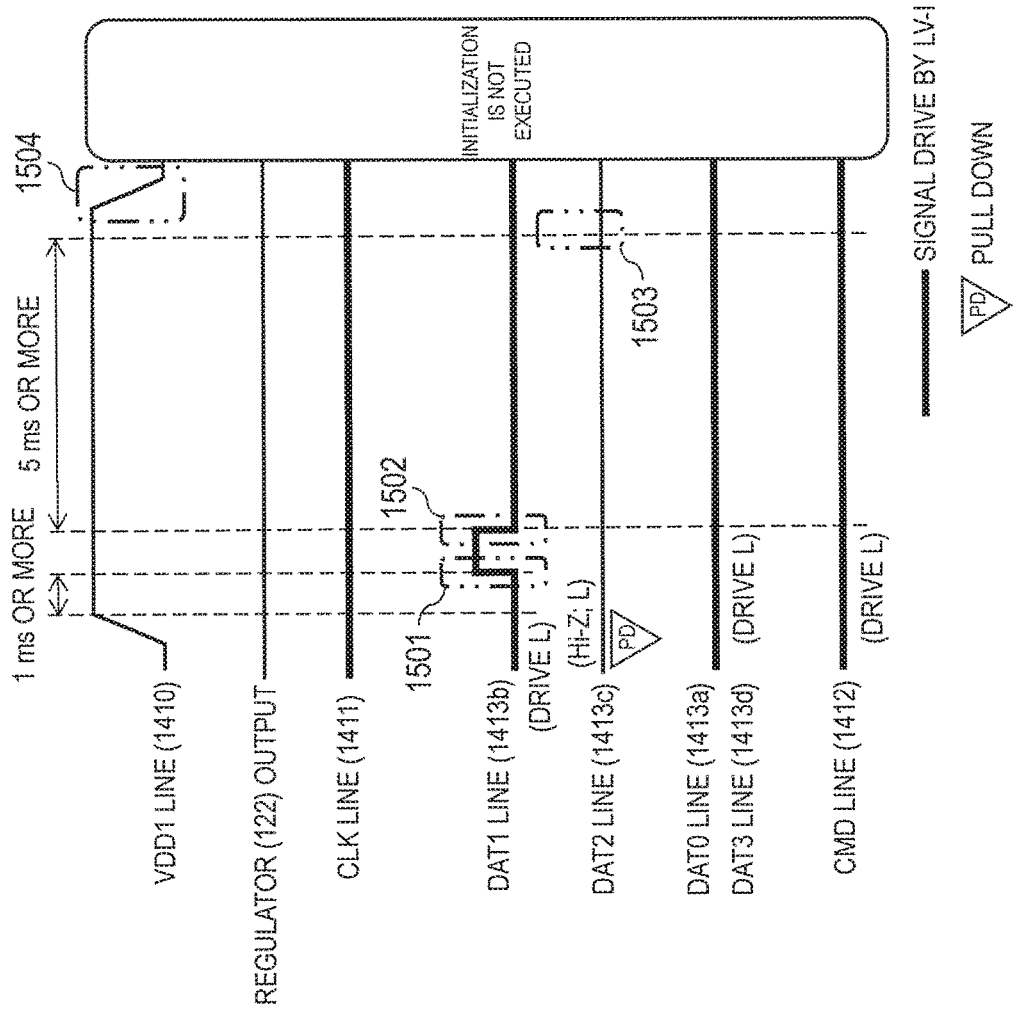
FIG. 15 is an explanatory view of an initialization routine of the removable system including the LV-I host device and the legacy slave device according to the fourth exemplary embodiment of the present disclosure.

FIG. 15 is an explanatory view of an operation performed after power activation in the removable system including LV-I host device 800 and legacy slave device 120 according to this exemplary embodiment.

5-2. Detailed Operations

Operations performed when legacy slave device 120 is connected to LV-I host device 800 will be described below with reference to FIG. 14 and FIG. 15.

3.3 V power supplied to legacy slave device 120 via VDD1 line 1410 is supplied to legacy I/F semiconductor chip 121 and back-end module 126, and legacy I/F semiconductor chip 121 and back-end module 126 become operable.

As with the first exemplary embodiment, LV-I host device 800 brings DAT2 line 1413*c* into a Hi-Z state and then pulls down DAT2 line 1413*c*, and pulls up CLK line 1411, CMD line 1412, DAT0 line 1413*a*, DAT1 line 1413*b*, and DAT3 line 1413*d* and then drives these lines to a low level. Then, LV-I host device 800 supplies 3.3 V power via VDD1 line 1410. 3.3 V power is supplied to slave I/F device 124 via SW 123.

Then, when 1 ms or more passes after power output VDD1 from LV-I host device 800 is stabilized at 3.3 V, LV-I host device 800 drives DAT1 line 1413*b* to a high level of 1.8 V (1501), and again drives DAT1 line 1413*b* to the low level within short time (for example, 10 μs) (1502).

However, even when LV-I host device 800 carries out the above-described operation, legacy slave device 120 cannot recognize that the above-described operation is notification of start of LV-I initialization. Therefore, in contrast to LV-I slave device 820, legacy slave device 120 does not drive DAT2 line 1413*c* to the high level within 5 ms after timing 1502.

Therefore, when LV-I host device 800 according to this exemplary embodiment detects that DAT2 line 1413*c* does not reach the high level even when 5 ms or more passes after timing 1502 (1503), LV-I host device 800 determines that the connected slave device is not LV-I slave device 820, namely, determines that the connected slave device does not support an LV-I I/F, and stops the supply of 3.3 V power via the VDD1 line 1410 (1504). Accordingly, LV-I host device 800 does not execute initialization by the LV-I I/F, and interrupts processing.

5-3. Effect

According to the fourth exemplary embodiment of the present disclosure, in a process of the initialization, legacy slave device 120 does not detect that DAT1 line 1413*b* transits from the low level to the high level and then again transits from the high level to the low level, and legacy slave device 120 does not drive the DAT2 line 1413*c* to the high level. Accordingly, LV-I host device 800 monitors DAT2 line 1413*c*, and when LV-I host device 800 does not detect that DAT2 line 1413*c* reaches the high level in predetermined time, LV-I host device 800 detects that the connected slave device is not compatible with the LV-I I/F, and does not carry out a subsequent initialization process. Accordingly, since no high voltage signal of 3.3 V is supplied from a slave device that is not LV-I slave device 820 to LV-I host device 800, host device I/F unit 804 having an upper limit of an input signal withstand voltage of 1.8 V is prevented from being destroyed.

Note that even when the LV-I host device according to this exemplary embodiment has a function of supplying 1.8 V power via VDD2 as in the third exemplary embodiment, a similar effect can be obtained because legacy slave device 120 has no terminal that receives the supply of VDD2.

Figure 16:
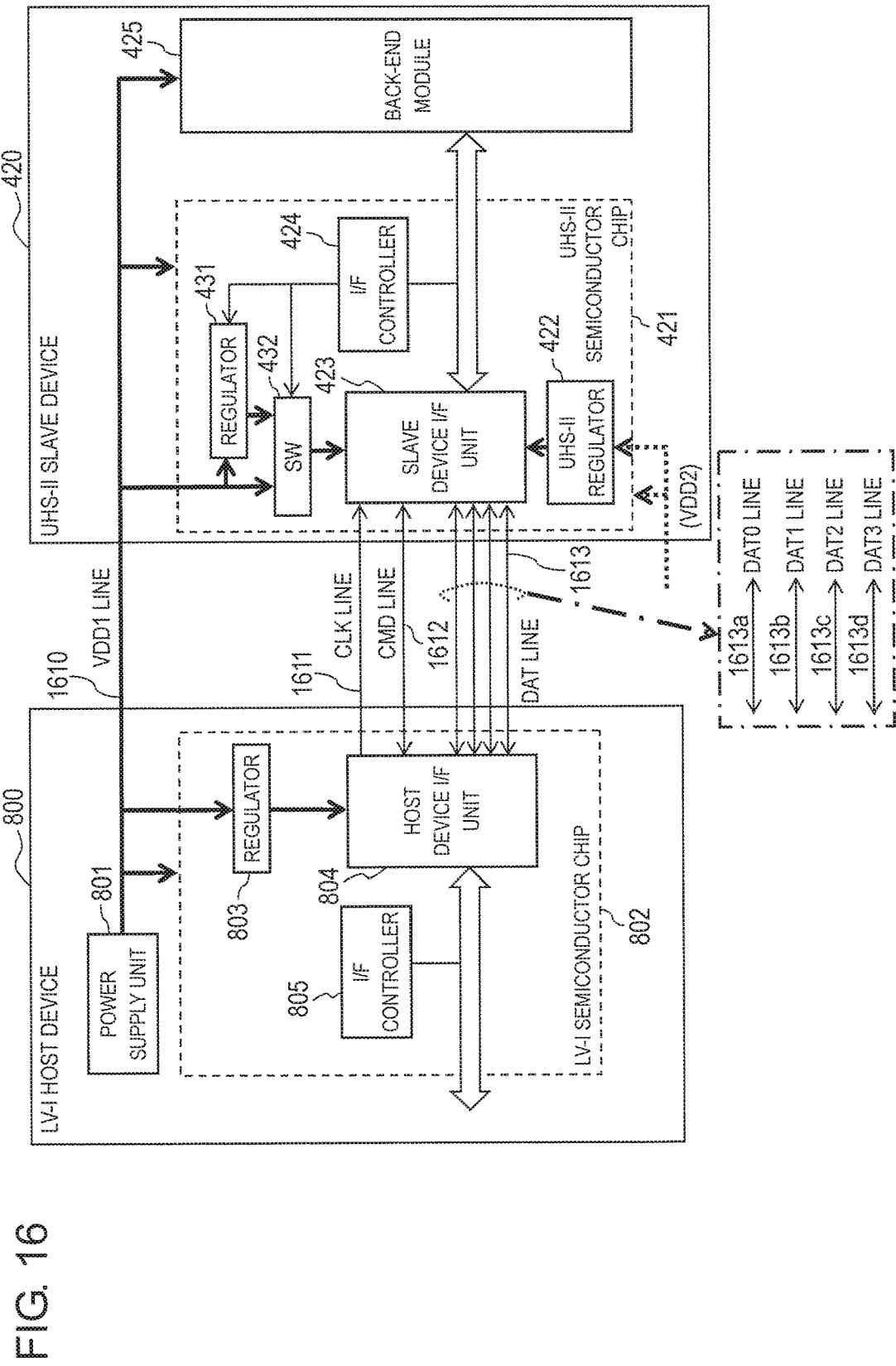
FIG. 16 is a block diagram illustrating a configuration of a removable system including an LV-I host device and a UHS-II slave device according to a fifth exemplary embodiment of the present disclosure.

6. Configuration and Operations of Removable System According to Fifth Exemplary Embodiment 6-1. Configuration FIG. 16 is an explanatory block diagram of a configuration of a removable system having detachable UHS-II slave device 420 connected to LV-I host device 800 of the present disclosure. Configurations of LV-I host device 800 and UHS-II slave device 420 are the same as the contents described above.

LV-I host device 800 and UHS-II slave device 420 are mechanically connected to each other. Moreover, LV-I host device 800 is electrically connected to UHS-II slave device 420 via VDD1 line 1410.

Host device I/F unit 804 and slave device I/F unit 423 perform signal communication via CLK line 1611, CMD line 1512, and DAT line 1613. Note that DAT line 1613 includes four signal lines of DAT0 line 1613*a*, DAT1 line 1613*b*, DAT2 line 1613*c*, and DAT3 line 1613*d*.

Figure 17:
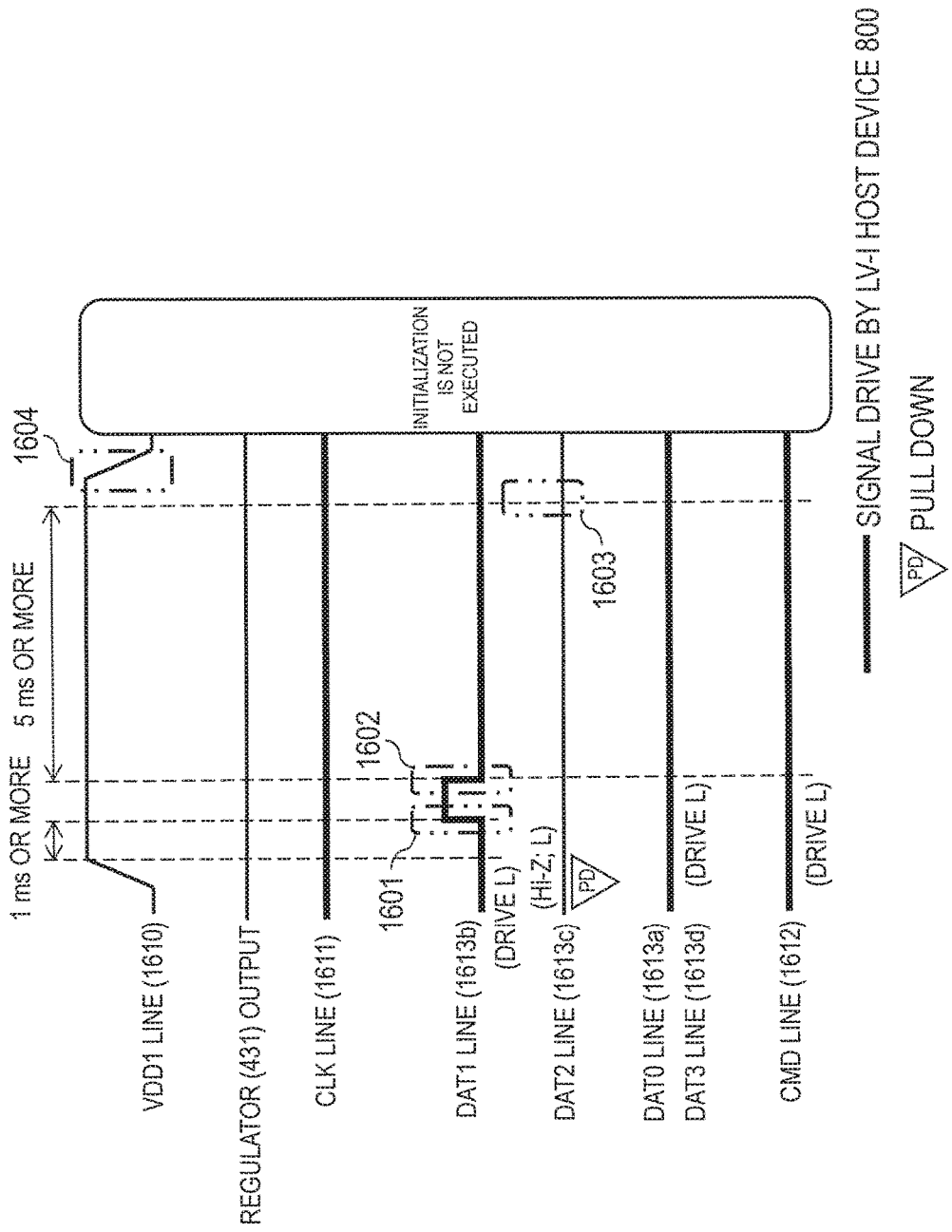
FIG. 17 is an explanatory view of an initialization routine of the removable system including the LV-I host device and the UHS-II slave device according to the fifth exemplary embodiment of the present disclosure.

FIG. 17 is an explanatory view of an operation performed after power activation in the removable system including LV-I host device 800 and UHS-II slave device 420.

6-2. Detailed Operations

Operations performed when UHS-II slave device 420 is connected to LV-I host device 800 will be described below with reference to FIG. 16 and FIG. 17.

On power activation, 3.3 V power is supplied from power supply unit 801 of LV-I host device 800 to UHS-II slave device 420 via VDD1 line 810.

On the other hand, since LV-I host device 800 supply no VDD2, no VDD2 is supplied to UHS-II semiconductor chip 421 in UHS-II slave device 420.

At this time, UHS-II slave device 420 supplies to UHS-II semiconductor chip 421, regulator 425, and SW 426 the 3.3 V power supplied via VDD1 line 1610. Then, immediately after the supply of VDD1, SW 426 supplies to slave device I/F unit 423 the 3.3 V power directly supplied via VDD1 line 1610.

When a signal is supplied to a semiconductor chip without power supply, there is an adverse effect on the semiconductor chip. For this reason, when no VDD2 is supplied to UHS-II semiconductor chip 421, VDD1 is supplied and accordingly the above-described situation is avoided.

On power activation, DAT1 line 1613*b* and DAT2 line 1613*c* are in a Hi-Z state in both LV-I host device 800 and UHS-II slave device 420. Accordingly, the respective signal lines reach the high level by a pull-up resistor (not illustrated).

When 1 ms or more passes after a power output from LV-I host device 800 is stabilized at VDD1=3.3 V, LV-I host device 800 transmits a 1.8 V single-ended signaling clock via CLK line 1411 and a low level signal via DAT1 line 1413*b* to UHS-II slave device 420.

As with legacy slave device 120 described in the fourth exemplary embodiment, even when LV-I host device 800 drives DAT1 line 1613*b* to a high level of 1.8 V (1701) and again drives DAT1 line 1613*b* to a low level within short time (for example, 10 μs) (1702), UHS-II slave device 420 also cannot recognize that the above-described operation is notification of start of LV-I initialization. Therefore, in contrast to LV-I slave device 820, UHS-II slave device 420 does not drive DAT2 line 1613*c* to the high level within 5 ms after timing 1702.

Therefore, when LV-I host device 800 according to this exemplary embodiment detects that DAT2 line 1613*c* does not reach the high level even when 5 ms or more passes after timing 1702 (1703), LV-I host device 800 also determines that the connected slave device is not LV-I slave device 820, namely, determines that the connected slave device does not support an LV-I I/F, and stops the supply of 3.3 V power via the VDD1 line 1610 (1704). Accordingly, LV-I host device 800 does not execute initialization by the LV-I I/F, and interrupts processing.

6-3. Effect

According to the fifth exemplary embodiment of the present disclosure, as with the fourth exemplary embodiment, since LV-I host device 800 does not detect that DAT2 line 1613*c* reaches the high level even when predetermined time passes, LV-I host device 800 detects that the connected slave device is not compatible with the LV-I I/F, and does not carry out a subsequent initialization process. Accordingly, since no high voltage signal of 3.3 V is supplied from the slave device that is not LV-I slave device 820 to LV-I host device 800, host device I/F unit 804 having an upper limit of an input signal withstand voltage of 1.8 V is prevented from being destroyed.

Figure 18:
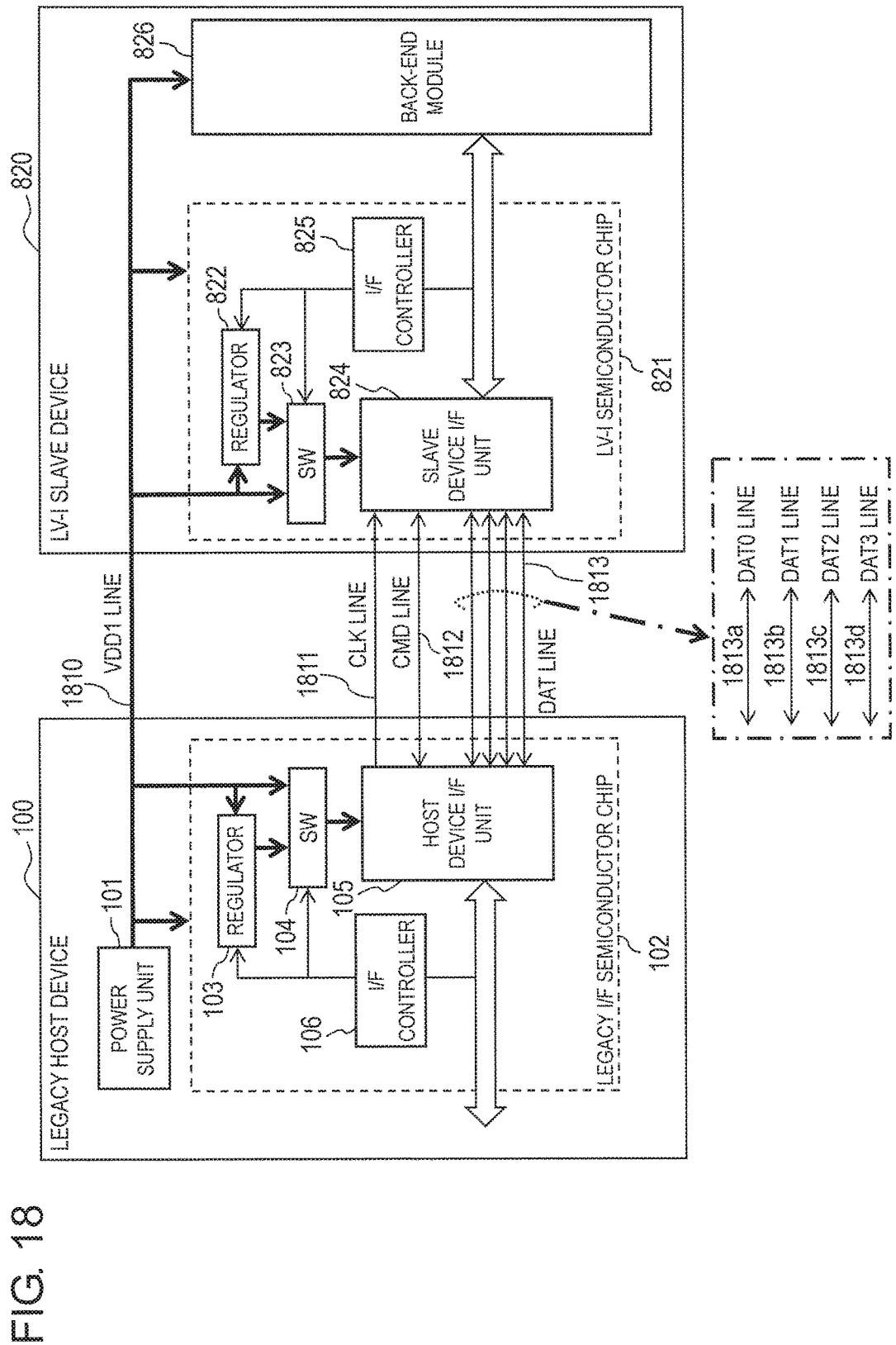
FIG. 18 is a block diagram illustrating a configuration of a removable system including a legacy host device and an LV-I slave device according to a sixth exemplary embodiment of the present disclosure.

7. Configuration and Operations of Removable System According to Sixth Exemplary Embodiment 7-1. Configuration FIG. 18 is an explanatory block diagram of a configuration of a removable system having detachable LV-I slave device 820 of the present disclosure connected to legacy host device 100. Configurations of legacy host device 100 and LV-I slave device 820 are the same as the contents described above. Note that LV-I slave device 820 according to this exemplary embodiment supports a legacy I/F. Therefore, an upper limit of an input signal withstand voltage of slave device I/F unit 824 of LV-I slave device 820 is 3.3 V.

Legacy host device 100 and LV-I slave device 820 are mechanically connected to each other. Moreover, legacy host device 100 is electrically connected to LV-I slave device 820 via VDD1 line 1810 that is a 3.3 V power line.

Host device I/F unit 105 and slave device I/F unit 824 perform signal communication via CLK line 1811, CMD line 1812, and DAT line 1813. Note that DAT line 1813 includes four signal lines of DAT0 line 1813*a*, DAT1 line 1813*b*, DAT2 line 1813*c*, and DAT3 line 1813*d*.

Figure 19:
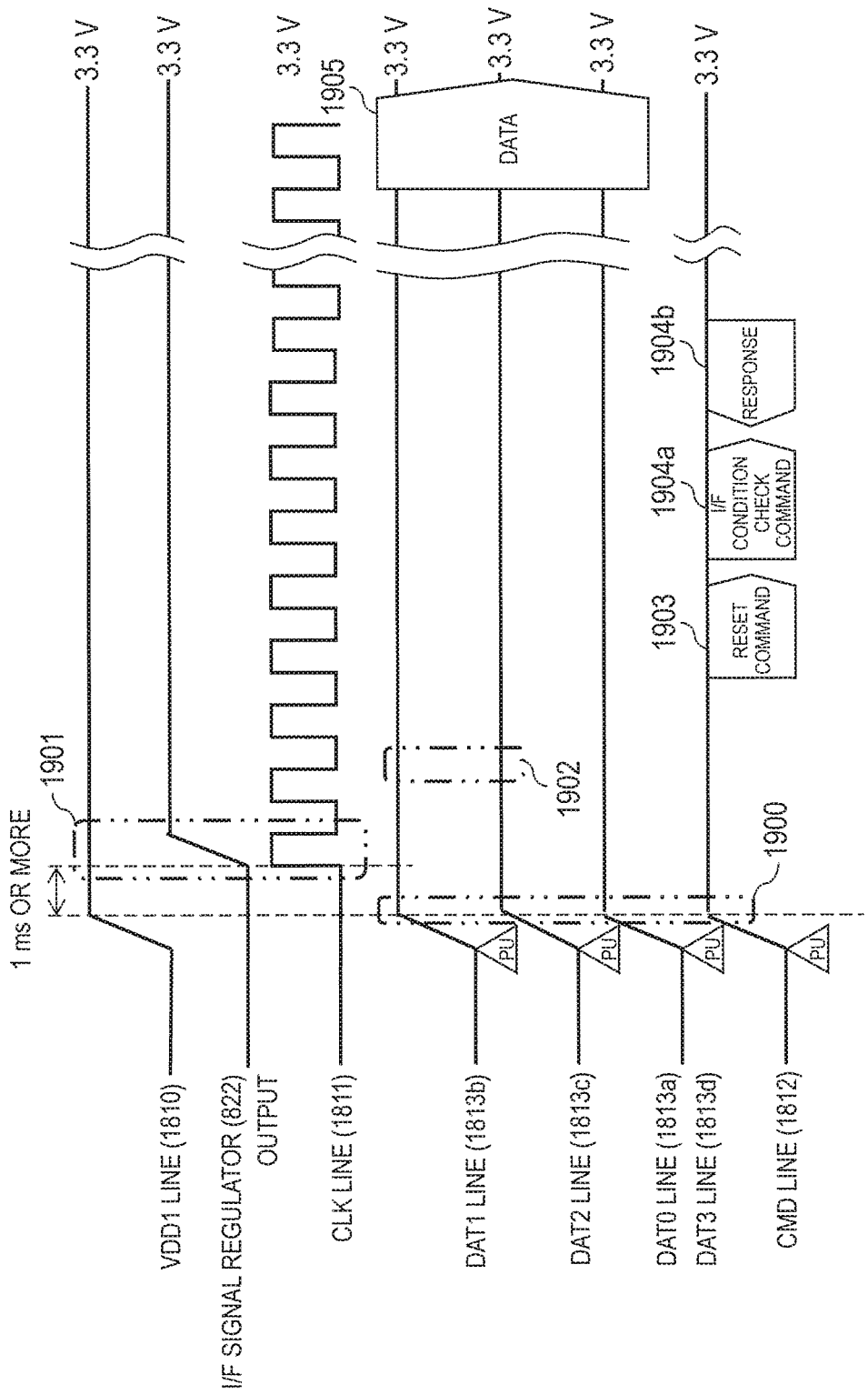
FIG. 19 is an explanatory view of an initialization routine of the removable system including the legacy host device and the LV-I slave device that supports a legacy interface according to the sixth exemplary embodiment of the present disclosure.

FIG. 19 is an explanatory view of an operation performed after power activation in the removable system including legacy host device 100 and LV-I slave device 820.

7-2. Detailed Operations

Operations performed when LV-I slave device 820 is connected to legacy host device 100 will be described below with reference to FIG. 18 and FIG. 19.

As described above, in order to avoid floating of each signal line without the slave device being attached, legacy host device 100 pulls up CMD line 1812 and entire DAT line 1813 to a predetermined voltage (normally 3.3 V) by a pull-up resistor (not illustrated), and then brings respective terminals of CMD line 1812 and DAT line 1813 into a Hi-Z state. Accordingly, the above-described signal lines transit to a high level (1900).

Note that depending on legacy host device 100, the timing of pulling up entire DAT line 1813 may be after power activation. Even in this case, as with legacy slave device 120 described in [1-2], even in LV-I slave device 820 according to this exemplary embodiment, DAT3 line 1813*d* is pulled up immediately after activation. At this time, in a case of legacy initialization, DAT3 line 1813*d* is pulled up immediately after activation and transits to the high level. For this reason, LV-I slave device 820 also detects DAT3 line 1813*d* together, and accordingly LV-I slave device 820 can discriminate a legacy I/F (a case of the high level) and a case of an LV-I I/F (a case of a low level) (since DAT1 line 1813*b* is always at the low level, a UHS-II I/F can be discriminated from the legacy I/F and the LV-I I/F).

After power activation, host device I/F unit 105 generates a clock of single-ended signaling of a 3.3 V signal by 3.3 V (high voltage) power to be supplied from power supply unit 101 via SW 104. Then, when 1 ms or more passes after a power output from power supply unit 101 is stabilized at 3.3 V, host device I/F unit 105 supplies the clock to slave device I/F unit 824 (1901).

Meanwhile, in contrast to LV-I host device 800, legacy host device 100 drives DAT1 line 1813*b* from the low level to the high level (of 1.8 V), and does not again drive DAT1 line 1813*b* to the low level within short time (for example, 10 μs). According to the above, in a view from LV-I slave device 820, DAT1 line 1813*b* seems to remain unchanged at the high level. LV-I slave device 820 does not drive the DAT2 line to the high level as long as LV-I slave device 820 does not detect at least transition of DAT1 line 1813*b* from the high level to the low level.

On the other hand, regardless of the change of DAT2 line 1813*c*, when predetermined time passes after the supply of the clock, legacy host device 100 also issues reset command 1903 and I/F condition check command 1904*a* so as to continue the initialization by the legacy I/F. Here, since LV-I slave device 820 is also compatible with the legacy I/F, I/F controller 825 confirms contents of I/F condition check command 1904*a*, and then generates relevant response 1904*b*, and returns response 1904*b* to legacy host device 100 via CMD line 1812. After this process, the initialization by the legacy interface and exchange of data 1905 are carried out between legacy host device 100 and LV-I slave device 820.

7-3. Effect

According to the sixth exemplary embodiment of the present disclosure, when LV-I slave device 820 is connected to legacy host device 100, legacy host device 100 does not drive DAT1 line 1813*b* from the high level to the low level after activation. Accordingly, since DAT1 line 1813*b* does not transit from the high level to the low level, LV-I slave device 820 determines that the initialization is not the initialization by the LV-I I/F, and does not drive DAT2 line 1813*c* to the high level.

Subsequently, legacy host device 100 starts the initialization by the legacy I/F, but since LV-I slave device 820 according to this exemplary embodiment supports the legacy I/F, the initialization by the legacy interface results in success.

As described in this exemplary embodiment, there is a possibility that the LV-I slave device be connected to the legacy host device and that the legacy initialization be performed. At this time, in a case where an initial value of power to be supplied to slave device I/F unit 824 is set at 1.8 V, even when the host device is detected to intend the legacy initialization, it is difficult to switch the power to be supplied to slave device I/F unit 824 to 3.3 V because of time constriction. Therefore, as described in the first exemplary embodiment, it is necessary to adopt a method in which the initial value of the power to be supplied to slave device I/F unit 824 is set at 3.3 V and when the initialization is detected to be the LV-I initialization, the power is switched to 1.8 V power.

Note that this exemplary embodiment is described assuming that LV-I slave device 820 also supports the legacy I/F, but this exemplary embodiment also applies to a case where LV-I slave device 820 does not support the legacy I/F.

Figure 20:
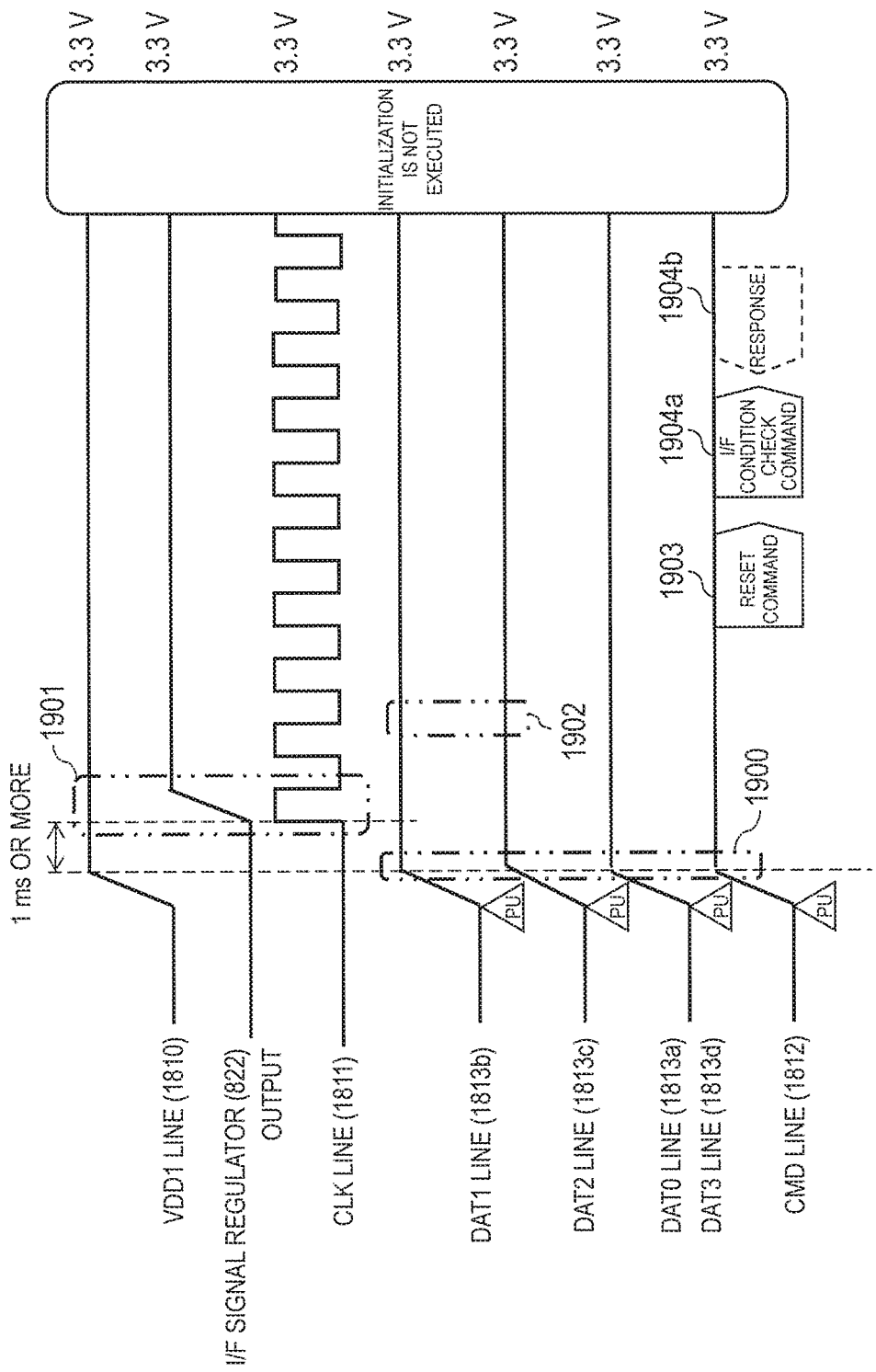
FIG. 20 is an explanatory view of an initialization routine of the removable system including the legacy host device and the LV-I slave device that does not support a legacy interface according to the sixth exemplary embodiment of the present disclosure.

As illustrated in FIG. 20, when LV-I slave device 820 that does not support the legacy I/F confirms contents of I/F condition check command 1904a, LV-I slave device 820 does not transmit relevant response 1904b. When legacy host device 100 fails to receive response 1904b even when predetermined time passes after the transmission of I/F condition check command 1904a, legacy host device 100 determines that the slave device does not support the legacy I/F, and interrupts subsequent processing.

However, in this case, since the 3.3 V signal is supplied from legacy host device 100 to LV-I slave device 820 without prior confirmation, at least the upper limit of the input signal withstand voltage of slave device I/F unit 824 needs to be 3.3 V even when LV-I slave device 820 does not support the legacy I/F.

Note that even when the LV-I slave device according to this exemplary embodiment has a function of receiving supply of 1.8 V power via VDD2 as in the third exemplary embodiment, a similar effect can be obtained because legacy host device 100 has no terminal that supplies VDD2.

Figure 21:
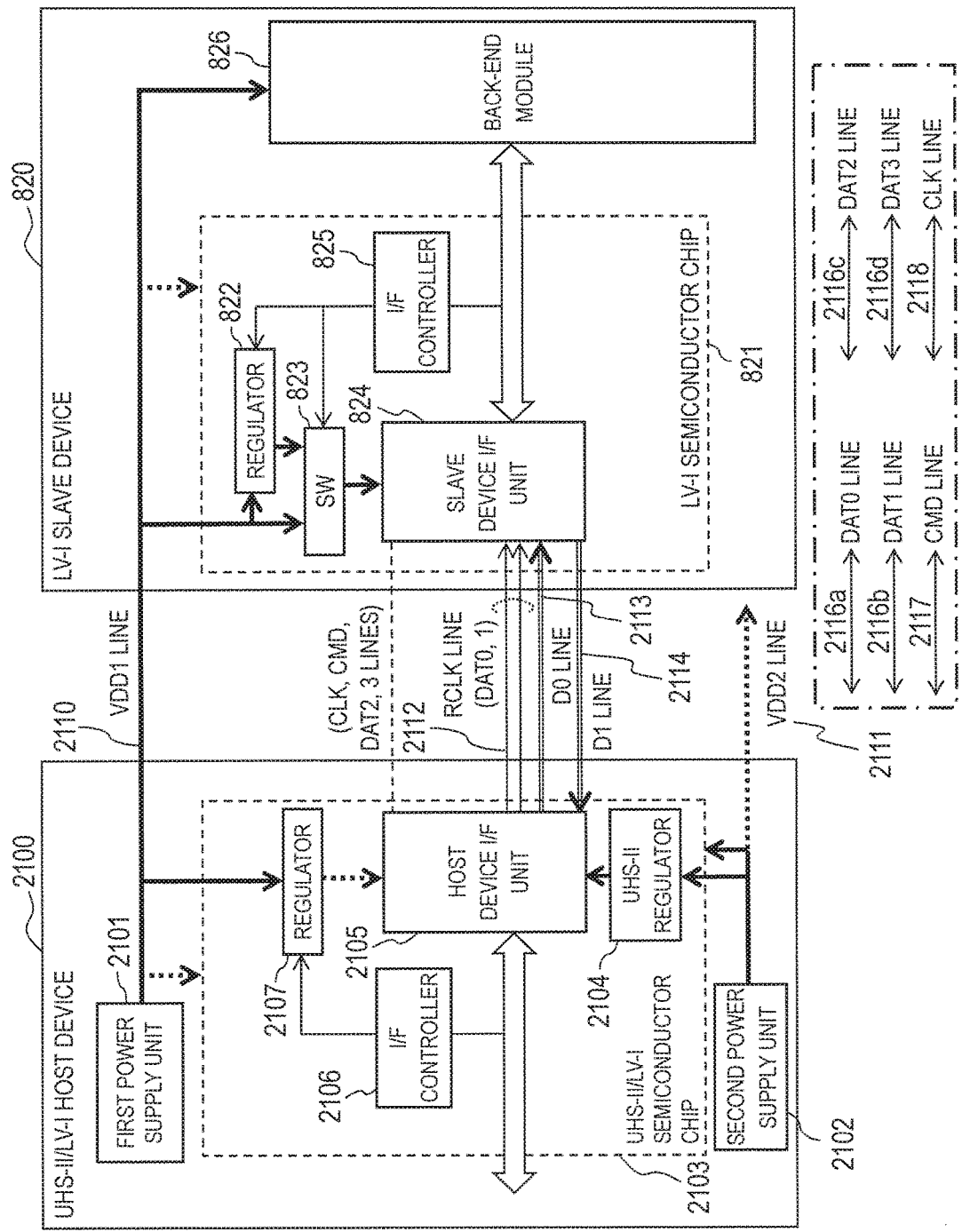
FIG. 21 is a block diagram illustrating a configuration of a removable system including a UHS-II/LV-I host device and an LV-I slave device according to a seventh exemplary embodiment of the present disclosure.

8. Configuration and Operations of Removable System According to Seventh Exemplary Embodiment 8-1. Configuration FIG. 21 is an explanatory block diagram of a configuration of a removable system having detachable LV-I slave device 820 of the present disclosure connected to UHS-II/LV-I host device 2100.

UHS-II/LV-I host device 2100 is a host device that includes the functions of UHS-II host device 400 and LV-I host device 800 described above. Namely, UHS-II/LV-I semiconductor chip 2103 includes both functions of UHS-II semiconductor chip 403 and LV-I semiconductor chip 802. Moreover, a configuration of LV-I slave device 820 is the same as the contents described above. Here, RCLK line 2112 includes DAT0 line 2116a and DAT1 line 2116b. Moreover, signal lines that are not used in a UHS-II I/F are DAT2 line 2116c, DAT3 line 2116d, CMD line 2117, and CLK line 2118. Note that LV-I slave device 820 according to this exemplary embodiment does not support the UHS-II.

UHS-II/LV-I host device 2100 and LV-I slave device 820 are mechanically connected to each other. Moreover, UHS-II/LV-I host device 2100 is electrically connected to LV-I slave device 820 via VDD1 line 2110 that is a 3.3 V power line. Moreover, UHS-II/LV-I host device 2100 has, in addition to VDD1 line 2110, VDD2 line 2111 that is a 1.8 V power line, but no VDD2 is supplied because LV-I slave device 820 has no terminal of the VDD2 line.

Host device I/F unit 2105 and slave device I/F unit 824 are connected by RCLK line 2112. UHS-II/LV-I host device 2100 includes terminals of D0 line 2113 and D1 line 2114. On the other hand, since LV-I slave device 820 has no terminal of D0 line 2113 nor D1 line 2114, a signal cannot be transmitted between UHS-II/LV-I host device 2100 and LV-I slave device 820 by using D0 line 2113 and D1 line 2114.

Moreover, DAT2 line 2116c, DAT3 line 2116d, CMD line 2117, and CLK line 2118 are not used in the UHS-II, but these lines are electrically connected such that UHS-II/LV-I host device 2100 or LV-I slave device 820 can also operate with a legacy I/F or an LV-I as described above.

Figure 22:
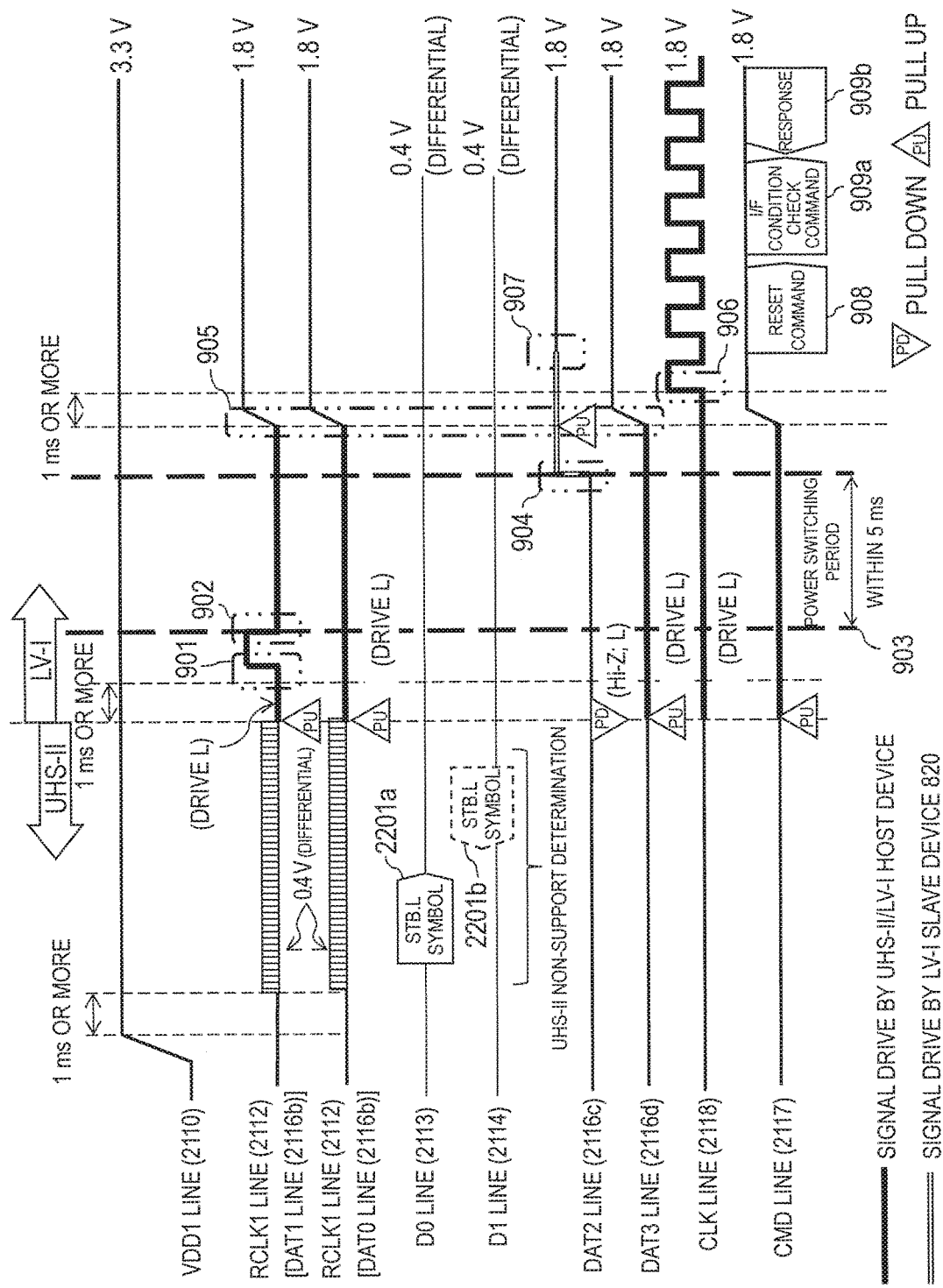
FIG. 22 is an explanatory view of an initialization routine of the removable system including the UHS-II/LV-I host device and the LV-I slave device that does not support a UHS-II interface according to the seventh exemplary embodiment of the present disclosure.

FIG. 22 is an explanatory view of a routine performed after power activation in UHS-II/LV-I host device 2100 and LV-I slave device 820.

8-2. Detailed Operations

Operations performed when LV-I slave device 820 is connected to UHS-II/LV-I host device 2100 will be described below with reference to FIG. 21 and FIG. 22.

On power activation, UHS-II/LV-I host device 2100 first intends UHS-II initialization. Then, 3.3 V power is supplied from first power supply unit 2101 of UHS-II/LV-I host device 2100 to LV-I slave device 820 via VDD1 line 2110. Moreover, 1.8 V power is output from second power supply unit 2102 of UHS-II/LV-I host device 2100 to VDD2 line 2111.

A state of each of five signal lines of DAT0 line 2116a, DAT1 line 2116b, DAT2 line 2116c, DAT3 line 2116d, and CMD line 2117 of UHS-II/LV-I host device 2100 is not defined. Namely, the state is any of states where
(1) the signal line is in a Hi-Z state, and results in being at a high level by a pull-up resistor,
(2) the signal line is in the Hi-Z state, and eventually results in being at a low level by a pull-down resistor,
(3) the signal line is driven to the low level by UHS-II/LV-I host device 2100, and
(4) the signal line is driven to the high level by UHS-II/LV-I host device 2100.

Moreover, CLK line 2118 is normally driven and fixed to the low level by UHS-II/LV-I host device 2100 because no pull-up resistor for CLK line 2118 is present.

In FIG. 21, UHS-II/LV-I host device 2100 supplies 3.3 V power to LV-I slave device 820 via the VDD1 line. On the other hand, as described above, since LV-I slave device 820 has no terminal of the VDD2 line, no VDD2 is supplied to LV-I slave device 820.

Now, when 1 ms or more passes after a power output is stabilized both at VDD1=3.3 V and at VDD2=1.8 V, UHS-II/LV-I host device 2100 does not particularly check a level of DAT2 line 2116c and transmits a differential reference clock via RCLK line 2112.

At this time, LV-I slave device 820 receives the differential reference clock via DAT1 line 2116b. Amplitude of the differential reference clock is −0.4 V to 0.4 V, and this is always detected as the low level in both cases of a 3.3 V signal and a 1.8 V signal. Therefore, even when LV-I slave device 820 receives RCLK of the UHS-II I/F, LV-I slave device 820 detects RCLK as a low level signal.

Now, in this exemplary embodiment, since UHS-II/LV-I host device 2100 fails to receive STB.L symbol 2201b even when predetermined time (200 µs) passes after STB.L symbol 2a is transmitted, UHS-II/LV-I host device 2100 determines that the UHS-II initialization cannot be performed (UHS-II non-support determination). At this time, UHS-II/LV-I host device 2100 intends initialization by the LV-I I/F without executing a power cycle.

Specifically, UHS-II/LV-I host device 2100 stops the supply of RCLK transmitted via RCLK line 2112 according to an instruction from I/F controller 2106, activates regulator 2107, switches a supply source of power to be supplied to host device I/F unit 2105 from UHS-II regulator 2104 to regulator 2107, and then performs the following operations.
(1) A terminal of DAT2 line 2116c is brought into the Hi-Z state and is pulled down.
(2) DAT0 line 2116a, DAT1 line 2116b, DAT3 line 2116d, and CMD line 2117 are pulled up and then driven to the low level.
(3) CLK line 2118 is driven to the low level.

When 1 ms passes after the above-described operations, UHS-II/LV-I host device 2100 drives DAT1 line 2116b to the high level of 1.8 V (901), and again drives DAT1 line 2116b to the low level within short time (for example, 10 µs) (902).

When slave device I/F unit 824 detects that DAT1 line 2116*b* transits from the low level to the high level and subsequently transits from the high level to the low level, UHS-II/LV-I host device 2100 switches power to be supplied to slave device I/F unit 824. Specifically, when slave device I/F unit 824 detects that DAT1 line 2116*b* transits from the high level to the low level, I/F controller 825 instructs regulator 822 to be activated, and further instructs SW 823 to switch the power to be supplied to slave device I/F unit 824 from 3.3 V power to 1.8 V power (an output of regulator 822).

After the above is completed, as with the first exemplary embodiment, slave device I/F unit 824 drives DAT2 line 2116*c* to the high level of 1.8 V within power switching period 903 (904), and accordingly slave device I/F unit 824 notifies UHS-II/LV-I host device 2100 of a fact that the LV-I initialization is acceptable. Operations following 904 are similar to the operations in the first exemplary embodiment.

8-3. Effect

According to the seventh exemplary embodiment of the present disclosure, when LV-I slave device 820 is connected to UHS-II/LV-I host device 2100, UHS-II/LV-I host device 2100 first intends the initialization by the UHS-II, but the initialization fails because LV-I slave device 820 does not support UHS-II I/F. Subsequently, after the supply of the differential reference clock via RCLK line 2112 is stopped, the LV-I initialization can be executed by operations similar to the procedure described in the first exemplary embodiment.

Note that on the first UHS-II initialization, UHS-II/LV-I host device 2100 transmits a differential reference clock of amplitude of 0.4 V via DAT1 line 2116*b*. However, this is equivalent for LV-I slave device 820 to always receive the low level signal. Therefore, LV-I slave device 820 does not erroneously misrecognize during the UHS-II initialization that the initialization is the LV-I initialization. Then, since LV-I slave device 820 detects after switching to the LV-I initialization that DAT1 line 2116*b* transits from the high level to the low level, LV-I slave device 820 can correctly recognizes the LV-I initialization.

Note that this exemplary embodiment is described assuming that LV-I slave device 820 does not support the UHS-II, but a similar effect can also be obtained when LV-I slave device 820 supports the UHS-II. At this time, LV-I slave device 820 has terminals of VDD2 line 2111, D0 line 2113, and D1 line 2114. When LV-I slave device 820 to which VDD2 that is 1.8 V power is supplied via VDD2 line 2111 receives STB.L symbol 2201*a* via D0 line 2113, LV-I slave device 820 transmits STB.L symbol 2201*b* via D1 line 2114. Subsequently, UHS-II/LV-I host device 2100 that has received STB.L symbol 2201*b* within predetermined time T continues the UHS-II initialization (FIG. 21).

Note that when the host device according to this exemplary embodiment is UHS-II host device 400 described with reference to FIG. 4 and fails to receive STB.L symbol 2201*b*, the host device cannot continuously execute the LV-I initialization, but there is not any adverse effect on LV-I slave device 820. Moreover, after UHS-II host device 400 fails the UHS-II initialization, UHS-II host device 400 intends legacy initialization as described with reference to FIG. 6. At this time, as long as LV-I slave device 820 supports the legacy I/F, the initialization by the legacy I/F and data transmission/reception can be executed.

Note that when the LV-I slave device according to this exemplary embodiment has a function of receiving supply of 1.8 V power via VDD2 as in the third exemplary embodiment, LV-I semiconductor chip 821 is driven by the 1.8 V power supplied by VDD2 line 2111, but a final result becomes the same.

Moreover, in this exemplary embodiment, as with the first exemplary embodiment, LV-I host device 2100 carries out the control of driving DAT1 line 2116*b* to the high level of 1.8 V and subsequently again driving DAT1 line 2116*b* to the low level. Instead of the above, as with the second exemplary embodiment, LV-I host device 2100 may adopt a method in which LV-I host device 2100 performs control of driving CLK line 2118 to the high level of 1.8 V and subsequently again driving CLK line 2118 to the low level, and LV-I slave device 820 detects this change. Moreover, as with the second exemplary embodiment, LV-I slave device 820 confirms that CMD line 2117 and entire DAT line 2116 are at the low level at timing when CLK line 2118 changes from the low level to the high level of 1.8 V immediately after transition to the LV-I initialization, and timing when CLK line 2118 again changes to the low level. Accordingly, LV-I slave device 820 can securely detect that the connected host device is the LV-I host device.

9. Supplementary Note

The present disclosure has described the method in which when a new LV-I is introduced in addition to a legacy I/F and an UHS-II that are existent interfaces between an SD card and a compatible host device, each of the LV-I host device and the LV-I slave device discriminates whether the other supports the LV-I (the first, second, third and seventh exemplary embodiments), and the method in which there is no adverse effect such as destruction on at least an existent host device and an existent slave device (the fourth to sixth exemplary embodiments, and the notes in the seventh exemplary embodiment).

In the former method, among the legacy host device, the UHS-II host device, and the LV-I host device, the LV-I host device is only one where the DAT1 line or the CLK line transits from the low level to be at the high level for a short period, and again transits to the low level until initialization is executed after power activation. For this reason, the LV-I slave device can easily specify the LV-I host device, and the LV-I host device brings the DAT2 line into the Hi-Z state and pulls down the DAT2 line on power activation. For this reason, the LV-I slave device drives the DAT2 line to the high level and transmits 1, and accordingly can make the LV-I host device recognize that the LV-I slave device is compatible with the LV-I I/F.

Moreover, in the latter method, the following four cases are discussed:
(1) the LV-I host device and the legacy slave device
(2) the LV-I host device and the UHS-II slave device
(3) the legacy host device and the LV-I slave device
(4) the UHS-II host device and the LV-I slave device.
It is confirmed that the LV-I host device having the upper limit of the input signal withstand voltage of 1.8 V receives no 3.3 V signal, and initialization is interrupted without causing signal collision in which the host device and the slave device drive signals at different voltage levels from each other, or initialization by the legacy I/F or the UHS-II I/F is correctly executed.

Moreover, as described in the sixth exemplary embodiment, there is a possibility that the LV-I slave device of the present disclosure be connected to the legacy host device. After activation, the legacy host device transmits the I/F condition check command by the 3.3 V signal without detecting characteristics of the connected slave device.

Therefore, when the LV-I slave device of the present disclosure supports the legacy I/F and also even when the LV-I slave device does not support the legacy I/F, the input signal withstand voltage of the LV-I semiconductor chip needs to be 3.3 V or more.

Moreover, in the present disclosure, the host device makes the DAT1 or CLK line transit from the low level to the high level and from the high level to the low level for a short period, and accordingly notifies the slave device of a fact that the host device intends to execute the LV-I initialization. On the other hand, the slave device drives the pulled-down DAT2 to the high level, and accordingly notifies the host device of a fact that the slave device supports the LV-I initialization. However, signal lines to be used are not limited to the above-described signal lines. For example, in the former case, instead of DAT1, the DAT0 line can also be driven to the high level for a short period.

Moreover, the signal line to be used in the LV-I of the present disclosure is equivalent to the legacy I/F. Therefore, there is an effect that it becomes unnecessary to increase a number of the terminals of the LV-I semiconductor chips of the host device and the slave device.

Moreover, the exemplary embodiments of the present disclosure has described that the voltage of the high voltage signal is 3.3 V and the voltage of the low voltage signal is 1.8 V, but other voltage values may be used as long as a relationship in voltage magnitude is kept.

Moreover, the time in the sequences in the exemplary embodiments of the present disclosure is an example, and other numerical values may be used as long as time is implementable.

Moreover, in the exemplary embodiments of the present disclosure, the 1.8 V signal and a 0 V signal are transmitted as the first voltage level and the second voltage level via the DAT1 line, the CLK line or the like in this order, but order is not limited to this order. Namely, after the 0 V signal is transmitted, the 1.8 V signal may be transmitted.

Moreover, preferably, the LV-I slave device of the present disclosure also includes the legacy I/F so as to be also capable of operating with the legacy host device. At this time, when the low voltage signal voltage is 1.8 V, the voltage is equal to a signal voltage in a UHS-I mode, and the LV-I semiconductor chip becomes easy to mount.

Meanwhile, preferably, the legacy initialization, the UHS-II initialization, and LV-I initialization can be identified according to a difference among initial states of the CLK line, the CMD line, and the DAT line including the four lines, which are essentially common signal lines. However, regardless of how to define an initial state of a signal of an LV-I I/F to be newly introduced according to the initial state of each signal in the legacy I/F and the UHS-II I/F as illustrated in FIG. 23, it is understood that the newly introduced LV-I I/F cannot be discriminated from the existent legacy I/F and the UHS-II I/F. Therefore, in LV-I host device 800 of the present disclosure, after stabilization of VDD1, the DAT1 line or the CLK line transits from the low level to be at the high level for a short period and again transits to the low level, and accordingly the LV-I host device 800 makes the LV-I slave device correctly recognize that the initialization is the LV-I initialization.

Now, in the above-described exemplary embodiments, legacy slave device 120 brings DAT0 line 113a to the Hi-Z state immediately after activation. On the other hand, there is a possibility that legacy slave device 120 that drives DAT0 line 113a to the high level immediately after activation and transmits 1 for convenience of implementation have already been popular in the market. Such legacy slave device 120 transmits the 3.3 V signal to the host device via DAT0 line 113a immediately after activation.

At this time, when the connected host device is LV-I host device 800 described above, the 3.3 V signal is supplied to host device I/F unit 804 having the upper limit of the input signal withstand voltage of 1.8 V, and there is a possibility of leading a problem of destruction of host device I/F unit 804.

Figure 24:
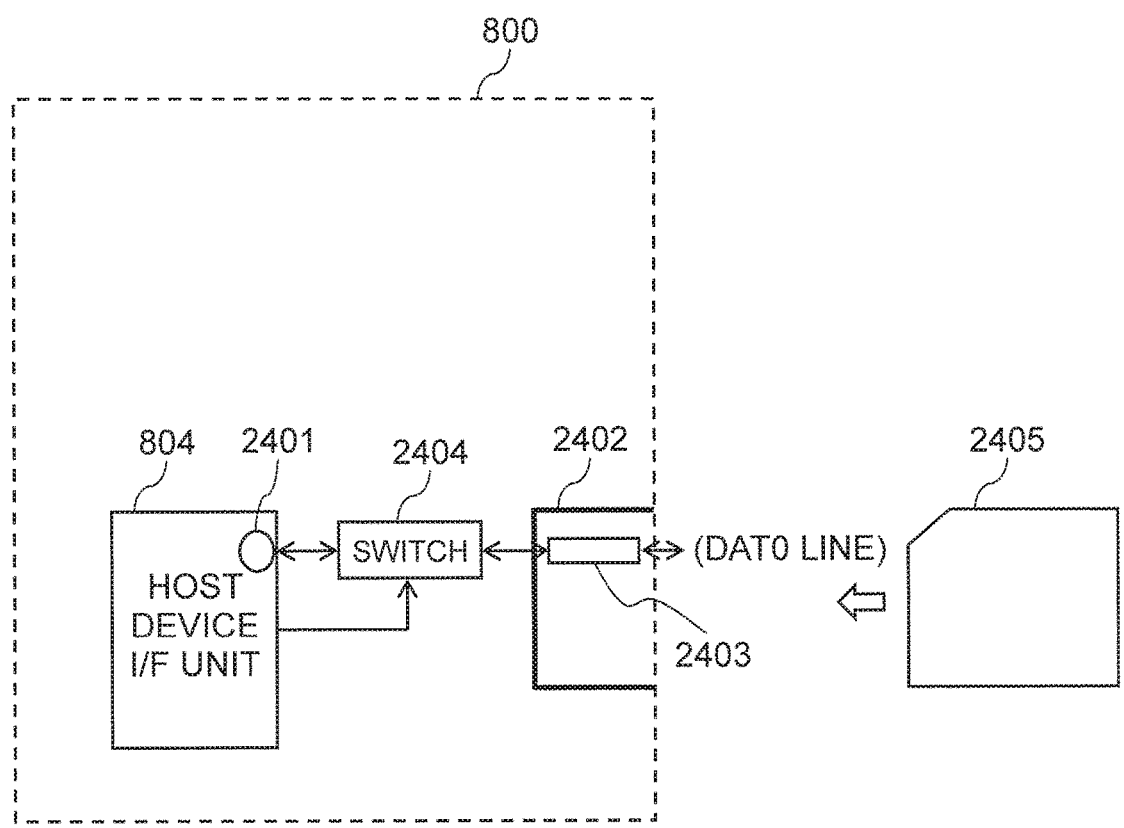
FIG. 24 is a block diagram illustrating an example of a configuration of an LV-I host device in a case where there is a possibility that a legacy slave device drive a DAT0 line to the high level on power activation.

In order to avoid such a situation, as illustrated in FIG. 24, it is considered to provide switch 2404 between DAT0 port 2401 of host device I/F unit 804 of LV-I host device 800 and DAT0 line terminal 2403 of slot 2402 to which slave device 2405 is attached. Switch 2404 has a function of switching a non-conductive state (OFF) and a conductive state (ON) of the DAT0 line in the host device outside of host device I/F unit 804.

Before the initialization by the LV-I, host device I/F unit 804 turns off switch 2404, and electrically disconnect DAT0 port 2401 and DAT0 line terminal 2403.

As illustrated in FIG. 8, when LV-I slave device 820 is connected as a slave device to LV-I host device 800, and when LV-I host device 800 detects that the DAT2 line is at the high level at 904 in FIG. 9, LV-I host device 800 recognizes that the connected slave device is LV-I slave device 820. Subsequently, host device I/F unit 804 turns on switch 2404, and electrically connect DAT0 port 2401 and DAT0 line terminal 2403.

Since LV-I slave device 820 described here does not transmit any 3.3 V signal to LV-I host device 800, the DAT0 line is connected without any problem after the slave device attached at 904 in FIG. 9 is detected to be LV-I slave device 820. Note that as illustrated in FIG. 12, a similar effect can also be obtained when LV-I host device 1200 and LV-I slave device 1220 serving as the slave device each have a VDD2 terminal.

On the other hand, when legacy slave device 120 is connected as a slave device to LV-I host device 800 as illustrated in FIG. 14, the host device does not detect that the DAT2 line is at the high level as illustrated in FIG. 15. This means that the connected slave device does not support the LV-I, and this results in that LV-I host device 800 does not execute initialization. At this time, as long as switch 2404 remains OFF, host device I/F unit 804 of LV-I host device 800 receives no 3.3 V signal even when legacy slave device 120 drives DAT2 to the high level so as to transmit 1. Moreover, at this time, LV-I host device 800 does not carry out initialization, and as a result, there is no problem even when switch 2404 remains OFF.

Note that even when the attached slave device is UHS-II slave device 420 that does not support the LV-I, a similar effect can be obtained.

The present disclosure can be applied to a removable system including a slave device such as an SD card and a compatible host device, and the above-described host device and slave device.

What is claimed is:

1. A host device to be connected to a slave device by a plurality of interfaces of different maximum voltage levels, the host device comprising:
a power supply unit that supplies power to the slave device;
a transmitter that transmits a signal to the slave device via a first signal line; and
a receiver that receives a signal from the slave device via a second signal line, wherein a following sequence of events occurs:
1) the power supply unit supplies power,
2) the transmitter transmits a non-repetitive sequence of a signal of a first voltage level and a signal of a second voltage level via the first signal line, and
3) when the receiver receives a signal of the first voltage level via the second signal line, the transmission of the signal of the second voltage level is stopped in the first signal line.

2. The host device according to claim 1, wherein
at least the first signal line is connected via a resistor to a signal line having the first voltage level, and
when the transmission of the signal of the second voltage level is stopped in the first signal line, the first signal line reaches the first voltage level.

3. The host device according to claim 1, wherein
at least the second signal line is connected via a resistor to a signal line having the second voltage level, and
when the receiver receives the signal of the first voltage level via the second signal line, the second signal line is connected via a resistor to the signal line having the first voltage level.

4. The host device according to claim 1, wherein when the receiver receives the signal of the first voltage level via the second signal line after the transmission of the signal of the second voltage level is stopped via the first signal line, a command signal is transmitted to the slave device.

5. The host device according to claim 1, wherein when the receiver does not receive the signal of the first voltage level via the second signal line, no command signal is transmitted to the slave device.

6. The host device according to claim 1, wherein before or immediately after the power supply unit supplies power, the host device transmits the signal of the second voltage level to a signal line other than the second signal line.

7. The host device according to claim 1, wherein the maximum voltage levels of the interfaces are 3.3 V and 1.8 V, and the host device is communicable by the interface having the maximum voltage level of 1.8 V.

8. The host device according to claim 1, wherein the first voltage level is 1.8 V, and the second voltage level is 0 V.

9. A slave device to be connected to a host device by a plurality of interfaces of different maximum voltage levels, the slave device comprising:
a power supply receiver that receives power from the host device;
a receiver that receives a signal from the host device via a first signal line; and
a transmitter that transmits a signal to the host device via a second signal line, wherein
following steps are performed by the slave:
1) the power supply receiver receives the power
2) the receiver receives a non-repetitive sequence of a signal of a first voltage level and a signal of a second voltage level via the first signal line,
3) the transmitter transmits the signal of the first voltage level via the second signal line.

10. The slave device according to claim 9, further comprising
a regulator that changes a voltage level of the power to be supplied from the power supply receiver,
wherein after activation of the regulator is completed, the signal of the first voltage level is transmitted via the second signal line.

11. The slave device according to claim 9, wherein when the first voltage level is detected via the first signal line and subsequently the second voltage level is detected, and when signal lines other than the first signal line are detected to be at the second voltage level, the signal of the first voltage level is transmitted via the second signal line.

12. The slave device according to claim 9, wherein when the receiver receives the signal of the first voltage level via the first signal line after the signal of the first voltage level is transmitted via the second signal line, the transmission of the signal of the first voltage level is stopped in the second signal line.

13. The slave device according to claim 9, wherein when the receiver does not sequentially receive the signal of the first voltage level and the signal of the second voltage level via the first signal line, the signal of the first voltage level is not transmitted via the second signal line.

14. The slave device according to claim 9, wherein before the power supply receiver receives power, at least the first signal line is brought into an open state.

15. The slave device according to claim 9, wherein the first voltage level is 1.8 V, and the second voltage level is 0 V.

16. A removable system comprising a host device and a slave device to be connected to each other by a plurality of interfaces of different maximum voltage levels, wherein
the host device supplies power to the slave device, and transmits a non-repetitive sequence of a signal of a first voltage level and a signal of a second voltage level via a first signal line, and when the slave device receives the signal of the first voltage level and the signal of the second voltage level via the first signal line, the slave device transmits a signal of the first voltage level to the host device via a second signal line,
when the host device receives the signal of the first voltage level via the second signal line, the host device stops the transmission of the signal of the second voltage level in the first signal line, and subsequently transmits a command signal to the slave device, and
when the slave device detects that the first signal line is not the signal of the second voltage level, the slave device stops the transmission of the signal of the first voltage level via the second signal line.

17. The removable system according to claim 16, wherein when the first voltage level is detected via the first signal line and subsequently the second voltage level is detected, and when signal lines other than the first signal line are detected to be at the second voltage level, the signal of the first voltage level is transmitted via the second signal line.

18. The removable system according to claim 16, wherein in the host device, before the power supply unit supplies power, signal lines other than the second signal line transmit the signal of the second voltage level.

19. The removable system according to claim 16, wherein the first voltage level is 1.8 V, and the second voltage level is 0 V.

20. A removable system comprising a host device and a slave device having a regulator, the host device and the slave device being connected to each other by a plurality of interfaces of different maximum voltage levels, wherein
the host device supplies power to the slave device, and transmits a non-repetitive sequence of a signal of a first voltage level and a signal of a second voltage level via a first signal line, and the slave device sequentially receives the signal of the first voltage level and the signal of the second voltage level via the first signal line, and after activation of the regulator is completed, the slave device transmits the signal of the first voltage level via a second signal line, when the host device receives the signal of the first voltage level via the second signal line, the host device stops the transmission of the signal of the second voltage level in the first signal line, and subsequently transmits a command signal to the slave device, and when the slave device detects that the first signal line is not the signal of the second voltage level, the slave device stops the transmission of the signal of the first voltage level via the second signal line.

21. A host device to be connected to a slave device by a plurality of interfaces of different maximum voltage levels, the host device comprising:
a power supply unit that supplies power to the slave device;
a transmitter that transmits a signal to the slave device via a first signal line;
a receiver that receives a signal from the slave device via a second signal line; and
a second transmitter that transmits a signal to the slave device via a third signal line, wherein a following sequence of events occurs:
1) the power supply unit supplies power,
2) the transmitter transmits a non-repetitive sequence of a signal of a first voltage level and a signal of a second voltage level via the first signal line,
3) the second transmitter transmits a second signal of the second voltage level via the third signal line, and
4) when the receiver receives the signal of the first voltage level via the second signal line, the transmission of the second signal of the second voltage level is stopped in the third signal line, and the transmitter transmits a repetitive sequence of a signal of the first voltage level and a signal of the second voltage level.

22. The host device according to claim 21, wherein
at least the third signal line is connected via a resistor to a signal line having the first voltage level, and
when the transmission of the second signal of the second voltage level is stopped in the third signal line, the third signal line reaches the first voltage level.

23. The host device according to claim 21, wherein
at least the second signal line is connected via a resistor to a signal line having the second voltage level, and
when the receiver receives the signal of the first voltage level via the second signal line, the second signal line is connected via a resistor to the signal line having the second voltage level.

24. The host device according to claim 21, wherein when the receiver receives the signal of the first voltage level via the second signal line after the transmission of the second signal of the second voltage level is stopped via the third signal line, a command signal is transmitted to the slave device.

25. The host device according to claim 21, wherein when the receiver does not receive the signal of the first voltage level via the second signal line, no command signal is transmitted to the slave device.

26. The host device according to claim 21, wherein before or immediately after the power supply unit supplies power, the host device transmits the signal of the second voltage level to a signal line other than the second signal line.

27. The host device according to claim 21, wherein the maximum voltage levels of the interfaces are 3.3 V and 1.8 V, and the host device is communicable by the interface having the maximum voltage level of 1.8 V.

28. The host device according to claim 21, wherein the first voltage level is 1.8 V, and the second voltage level is 0 V.

29. A slave device to be connected to a host device by a plurality of interfaces of different maximum voltage levels, the slave device comprising:
a power supply receiver that receives power from the host device;
a receiver that receives a signal from the host device via a first signal line ; and
a transmitter that transmits a signal to the host device via a second signal line, wherein a following sequence of events occurs:
1) when the power supply receiver receives the power and
2) the receiver receives a non-repetitive sequence of a signal of a first voltage level and a signal of a second voltage level via the first signal line,
3) the transmitter transmits the signal of the first voltage level via the second signal line,
wherein the slave device further comprises a second receiver that receives a signal from the host device via a third signal line,
wherein when the second receiver receives a signal of the first voltage level via the third signal line after the signal of the first voltage level is transmitted via the second signal line, the transmission of the signal of the first voltage level is stopped in the second signal line.

30. The slave device according to claim 29, further comprising
a regulator that changes a voltage level of the power to be supplied from the power supply receiver,
wherein after activation of the regulator is completed, the signal of the first voltage level is transmitted via the second signal line.

31. The slave device according to claim 29, wherein when the first voltage level is detected via the first signal line and subsequently the second voltage level is detected, and when signal lines other than the first signal line are detected to be at the second voltage level, the signal of the first voltage level is transmitted via the second signal line.

32. The slave device according to claim 29, wherein when the receiver does not receive the non-repetitive sequence of the signal of the first voltage level and the signal of the second voltage level via the first signal line, the signal of the first voltage level is not transmitted via the second signal line.

33. The slave device according to claim 29, wherein before the power supply receiver receives power, at least the first signal line is brought into an open state.

34. The slave device according to claim 29, wherein the first voltage level is 1.8 V, and the second voltage level is 0 V.

35. A removable system comprising a host device and a slave device to be connected to each other by a plurality of interfaces of different maximum voltage levels, wherein
the host device supplies power to the slave device, and transmits a non-repetitive sequence of a signal of a first voltage level and a signal of a second voltage level via a first signal line, and when the slave device receives the signal of the first voltage level and the signal of the second voltage level via the first signal line, the slave device transmits the signal of the first voltage level to the host device via a second signal line,
when the host device transmits a second signal of the second voltage level via a third signal line and receives the signal of the first voltage level via the second signal line, the host device stops the transmission of the second signal of the second voltage level in the third signal line, and subsequently transmits a command signal to the slave device, and when the slave device detects that the third signal line is not the second signal of the second voltage level, the slave device stops the transmission of the signal of the first voltage level via the second signal line.

36. The removable system according to claim 35, wherein when the first voltage level is detected via the first signal line and subsequently the second voltage level is detected, and when signal lines other than the first signal line are detected to be at the second voltage level, the signal of the first voltage level is transmitted via the second signal line.

37. The removable system according to claim 35, wherein in the host device, before the power supply unit supplies power, signal lines other than the second signal line transmit the signal of the second voltage level.

38. The removable system according to claim 35, wherein the first voltage level is 1.8 V, and the second voltage level is 0 V.

39. A removable system comprising a host device and a slave device having a regulator, the host device and the slave device being connected to each other by a plurality of interfaces of different maximum voltage levels, wherein the host device supplies power to the slave device, and transmits non-repetitive sequence of a signal of a first voltage level and a signal of a second voltage level via a first signal line, and the slave device receives the non-repetitive sequence of the signal of the first voltage level and the signal of the second voltage level via the first signal line, and after activation of the regulator is completed, the slave device transmits a signal of the first voltage level via the second signal line, when the host device transmits a second signal of the second voltage level via a third signal line and receives the signal of the first voltage level via the second signal line, the host device stops the transmission of the second signal of the second voltage level in the third signal line, and subsequently transmits a command signal to the slave device, and when the slave device detects that the third signal line is not the second signal of the second voltage level, the slave device stops the transmission of the signal of the first voltage level via the second signal line.

* * * * *